(12) United States Patent
Johnson

(10) Patent No.: US 6,662,903 B2
(45) Date of Patent: *Dec. 16, 2003

(54) TREE STAND AND CLIMBING DEVICES

(76) Inventor: Steve M. Johnson, 418 Christians Bend Rd., Churchill, TN (US) 37642

( * ) Notice: Subject to any disclaimer, the term of this patent is extended or adjusted under 35 U.S.C. 154(b) by 0 days.

This patent is subject to a terminal disclaimer.

(21) Appl. No.: 09/878,168

(22) Filed: Jun. 12, 2001

(65) Prior Publication Data

US 2002/0043430 A1 Apr. 18, 2002

Related U.S. Application Data

(63) Continuation of application No. 09/436,492, filed on Nov. 9, 1999, now Pat. No. 6,264,000.
(60) Provisional application No. 60/117,863, filed on Jan. 29, 1999.

(51) Int. Cl.[7] .............................. A63B 27/00; E04G 3/00
(52) U.S. Cl. ...................... 182/136; 182/187; 24/16 PB
(58) Field of Search ................................. 182/135, 136, 182/187, 188, 116, 20

(56) References Cited

U.S. PATENT DOCUMENTS

| | | | |
|---|---|---|---|
| 2,060,953 A | | 11/1936 | Strom |
| 2,722,968 A | | 11/1955 | Smith |
| 3,960,240 A | | 6/1976 | Cotton |
| 4,316,526 A | | 2/1982 | Amacker |
| 4,331,216 A | | 5/1982 | Amacker |
| 4,417,645 A | | 11/1983 | Untz |
| 4,452,338 A | | 6/1984 | Untz |
| 4,488,620 A | * | 12/1984 | Gibson ........................ 182/135 |
| 4,605,094 A | | 8/1986 | Minerd |
| 4,726,447 A | | 2/1988 | Gibson et al. |
| 4,727,961 A | | 3/1988 | Dawson |
| 4,813,441 A | | 3/1989 | Kepley |
| 4,890,694 A | | 1/1990 | Williams |
| 4,909,353 A | * | 3/1990 | Govin et al. ................. 182/187 |
| 4,953,662 A | | 9/1990 | Porter |
| 4,969,538 A | | 11/1990 | Amacker |
| 5,086,874 A | | 2/1992 | Treants |
| 5,097,925 A | | 3/1992 | Walker, Jr. |
| 5,101,934 A | * | 4/1992 | Zumbro ...................... 182/187 |
| 5,234,076 A | | 8/1993 | Louk et al. |
| 5,265,780 A | * | 11/1993 | Matthews et al. ...... 182/187 X |
| 5,492,198 A | | 2/1996 | Williams |
| 5,588,499 A | | 12/1996 | Carriere |
| 5,642,789 A | | 7/1997 | Maxwell |
| 5,848,666 A | * | 12/1998 | Woodall et al. ............. 182/187 |
| 5,862,883 A | * | 1/1999 | Carriere ..................... 182/135 |
| 6,082,492 A | * | 7/2000 | Yerger ........................ 182/136 |
| 6,264,000 B1 | | 7/2001 | Johnson |

OTHER PUBLICATIONS

Letter dated Mar. 28, 2000 from Mathew Corr to Bear River Tree Stands.
Lone Wolf, Inc. product advertisement post–marked Aug. 6, 1999.
Blackwater Creek Treestands product advertisement in Deer & Deer Hunting, Jan. 1999.
Blackwater Creek Treestands and Lonewolf, Inc. product advertisements in Sportsman's Bowhunting Annual 1999, pp. 62–67, No month available.

* cited by examiner

Primary Examiner—Hugh B. Thompson

(57) ABSTRACT

A tree stand and/or climbing device of multiple designs preferably using industrial machinery style belts to provide maximum strength and gripping power. The belts are preferably made of tough rubber compounds and inlaid with various high strength fibers and other materials. The belts preferably have a uniform teeth pattern, which provide flexibility and allow the belt to conform to uneven surfaces on a tree. The teeth and flexible nature of the industrial belts provide a mechanism for securing the belts and adjusting the length for a wide-range of tree diameters. Dual or multiple belt or fastening device designs allow individuals to climb past limbs or other obstacles and maneuver around forks in trees. The invention also relates to climbing steps to serve as hand grips and/or foot rests during climbing. The invention also concerns a slip-lock locking device.

21 Claims, 28 Drawing Sheets

TREE STAND AND CLIMBING DEVICES

RELATED APPLICATION

This application is a continuation of U.S. application Ser. No. 09/436,492, filed Nov. 9, 1999, now U.S. Pat. No. 6,264,000, and claims benefit of application Ser. No. 60/117,863 filed Jan. 29, 1999 the contents of which are incorporated by reference herein in their entirety.

FIELD OF THE INVENTION

The invention relates to a removable, portable stand and climbing steps for temporary or permanent attachment to a tree to obtain an observation point at a desired height for use while hunting, wildlife photography, and observation and the like. This invention allows an individual to climb a wide range of tree diameters from small to very large, including trees with branches that would typically be obstacles when climbing trees with currently available tree stands.

BACKGROUND AND SUMMARY OF THE INVENTION

There are presently a wide variety of devices for climbing trees and poles which are commercially available. All of these devices are attached and/or supported about the tree or pole by means of straps, rods, bars, or blades. All of these devices have a number of disadvantages. Many of these stands cause considerable damage to the trees to which they are attached due to the sharp blades or bark penetrating spikes affixed to the tree engaging edges. Another major disadvantage is the required manipulation of nuts, bolts, and/or knobs necessary to attach and remove these devices. Such manipulations are consistently difficult, time consuming and noisy. More importantly, such stands cannot be adjusted for tree taper as the user ascends and descends the tree or pole. This lack of adjustment causes vertical slippage of the tree engaging edges and causes these devices to tilt downward in an unsafe manner. Another disadvantage that can arise with most conventional climbing tree stands is that the tree must have in general a diameter of between 6 to 24 inches. Traditionally, most blade style climbing stands are limited to diameters ranging between 8 to 20 inches. Some other stands such as steel strap, cable, or chain style designs will adjust to a slightly smaller or larger diameter such as 6 to 24 inches. Trees below 6 inches and larger than 24 inches in diameter are very difficult if not impossible to climb. Thus trees such as a mature white oak, that produces acorns, a favorite forage food for wildlife such as deer and turkey, are virtually impossible to climb because of the larger diameter of the girth of the tree.

Other factors to consider are the straightness and the height that the tree stand can reach due to limbs or forks in the trees which form obstacles for traditional tree stands. Trees that have limbs or forks at lower levels create problems for the hunter, wildlife observer, or photographer. The field of view is reduced greatly from a lower vantage point due to existing brush, smaller trees, etc. Also, the lower observation point greatly increases an animal's awareness of the individual and could possibly alert the animal, by either sight or smell, and spoil the opportunity for a closer appearance of the animal.

Thus, individuals having traditional climbing style tree stands generally have to avoid the above mentioned style trees and climb a straight tree of certain diameter that has no limbs or forks up to the desired height of observation. This greatly reduces the number of trees which may be climbed and makes the individual select another site or a tree that may not be as preferred. For example, difficult to climb trees such as oak trees, apple trees or other trees having forks or low branches may prevent an individual from locating their tree stand next to trails and water holes typically frequented by animals such as deer, antelope, moose and the like.

The present invention provides some greatly improved designs among portable tree stands and climbing devices, thus eliminating the problems mentioned above. The stand of the invention may be a single stand which may be positioned in a tree at a desired elevation by any means including the use of commercially available portable ladders, climbing belts, climbing boots, ropes, spikes, etc. or can be positioned in the tree manually. In a preferred aspect, an upper and lower stand combination is used. The upper stand in such dual design is typically used as the climber (which enables a person to climb the tree) and the lower stand functions as the main platform for wildlife observation once the desired height is reached. In a preferred aspect, the upper stand or climber may comprise one or more seats allowing one or more individuals to sit once the main platform is in place. Examples of dual stands are described in U.S. Pat. No. 3,960,240 to Cotton issued Jun. 1, 1976; U.S. Pat. No. 4,316,526 to Amacker issued Feb. 3, 1982; U.S. Pat. No. 4,331,216 to Amacker issued May 25, 1992; U.S. Pat. No. 4,417,645 to Uniz issued Nov. 29, 1983; U.S. Pat. No. 4,452,338 to Uniz issued Jun. 5, 1984; U.S. Pat. No. 4,726,447 to Gibson et al issued Feb. 23, 1984; U.S. Pat. No. 4,953,662 to Porter issued Sep. 4, 1990; U.S. Pat. No. 4,969,538 to Amacker issued Nov. 13, 1990; and U.S. Pat. No. 5,097,925 to Walker.

The present invention enables an individual to safely climb most trees including both small and large diameter trees. The invention also enables the individual to climb past limbs or to climb forked trees safely. Thus, the invention provides a means to climb any tree to a height above the canopy thus providing an advantage of concealment or camouflage. By being above the limbs, the individual is hidden by natural vegetation such as limbs and leaves. This allows the hunter, observer, or wildlife photographer to move more easily without alerting the animal of the individual's presence.

The preferred stand of the invention comprises a load-supporting structure or platform and at least one belt (preferably two, three, four, five or more belts) which are used to hold the load-supporting structure or platform in a fixed position in a tree or other structure. The belt(s) may be attached or fastened to the platform directly or indirectly. Direct attachment may involve connecting the belt with one or more attachment devices (such as bolts, screws, glue, bonding cement, wires, etc.) to the platform, but preferably involves connecting the belt with at least one locking device which is attached to the platform. Indirect attachment may involve connection of the belt to one or more supports (such as pipes, rods, tubes, etc.) which are attached to the platform. Preferably, such belt or belts are flexible enough to conform to the tree as weight is applied downward on the load-supporting structure or platform from the individual. As weight is lifted, the belt or belts release their grip from the tree allowing vertical movement up or down the tree.

To climb using the dual stand design, the climber and main platform (where the individual's feet typically rest) work together in unison. When the individual's weight is shifted to the main platform, this allows the climber to be moved or repositioned. The climber is moved up to ascend the tree or down when descending the tree. Weight or force is then applied downward to the climber by the individual thus locking the climber into place. This allows the main platform to be raised or lowered by shifting the weight from the main platform to the climber. The stand can now be raised or lowered by the simple method of the individual tilting his or her feet, which are secured to the main stand (e.g., with one or more foot traps). Such action disengages the main platform so that it may be moved or repositioned up or down the tree. Once positioned in the desired location, weight or force is applied to the platform (preferably by the individual standing on the platform) thereby allowing the main platform to reengage the tree. This procedure is repeated any number of times to ascend or descend the tree. In the dual stand design, the climber and main platform or both may comprise the one or more belts of the invention. In another aspect, the climber and stand may be operably connected.

In a preferred aspect, two belts or more (e.g. two, three, four, five or more) are used to allow safe movement around limbs, or to climb a forked tree. Preferably, one belt is unfastened while the second holds the stand secure. Then the first belt may be positioned over or above the fork or limb and then refastened to the stand. The belt below the limb or fork may then be moved while the belt above the limb or fork holds the stand secure to the tree. To climb down a tree having limb or fork obstacles, the process is reversed. Thus, the invention provides a secure, safe procedure to climb past limbs on trees or forked trees. In this aspect of the invention, multiple belts, chains, cables, bands, straps, ropes or combinations thereof may be used, although the use of two belts is preferred. Again, the multiple fastening devices (e.g. belts, chains, etc.) may be contained on the climber, the main platform or both. Examples of using bands, chains and cables in stands may be found in U.S. Pat. Nos. 4,890,694, 5,588,499, 5,097,925 and 5,234,076.

Any one or more belts or belt combinations may be used including V-belts, belts with teeth, ribs, grooves or notches or any industrial machine belts used to drive pulleys for industrial equipment, automobiles or trucks. Such teeth, grooves, ribs, notches and the like may be positioned substantially vertical or perpendicular on the belt and may be located on one, both or all sides of the belt. The width, thickness and general design of the belts may vary depending on the need or availability. For example, the cross section of the belt may have a square, rectangular, oval, circular, or triangular appearance or may have a pentagon, hexagon, septagon, octagon, etc. shape. The composition of the belt may be any material or combination of materials such as leather, polymers, plastic, rubber, fibers, and rubber and fiber combinations (and any combinations thereof). Preferred belts of the invention may be obtained from Gates, Goodyear and Dayco. The preferred belt is a Gates Tripower CX model as well as other Gates Tripower models such as DX and BX.

Preferably, the belts of the invention comprise teeth, notches, ribs or grooves that are used to allow the belts to conform and grip to the tree. In a preferred aspect, the belts are positioned such that the teeth, notches, etc. of the belt(s) contact with the tree, although the teeth, notches, etc. may be positioned away from the tree. The teeth, notches, ribs or grooves are preferably uniformly spaced having the same peak to valley distance, height, and width. Such teeth, ribs, notches or grooves are preferably used to adjust and lock down or hold the belt to prevent belt slippage. In one example, the teeth, notches, ribs, or grooves are allowed to interlock or mesh to secure or lock the belt in place (e.g., similar to a zipper). Such interlocking or meshed teeth, notches, ribs, or grooves of the belts may be held in place by any locking device such as pins, bolts, clamps, vices, springs, and the like. In another embodiment, the teeth, notches, ribs, grooves of the belts may be interlocked or meshed with similar teeth, notches, ribs, grooves located in or on a locking device. Such device of the invention may be made from any material including metal, plastic, polymers, rubber, etc. The lock down device may also contain a portion of the belt which provides the corresponding teeth, notches, grooves, etc. to mesh or interlock with the belt. Other ways or devices allowing adjustment and locking the belts, particularly belts comprising teeth, notches, or grooves, will be readily apparent to those skilled in the art. In one such aspect, the invention provides a slip-lock device which allows movement of the belt in one direction in or through the device for example, to tighten the belt against or around the tree (e.g., the "slip" direction), but prevents movement in the opposite direction (e.g., the "lock" direction). Preferably, the slip-lock device comprises a release to unlock or allow movement of the belt so that the belt may be moved in both directions in or through the device. Thus, the slip-lock device allows easy adjustment and locking of the belt length during set up or climbing. For example, the slip-lock device allows belt adjustment in one direction without the need to disengage the locking element of the device. Such a feature would be useful for quick set up to engage the stand with the tree or to compensate for tree taper while climbing. The slip-lock device may also be used in accordance with the invention with any one or a number of fastening devices (e.g., belts, chains, bands, cords, straps, cables, rods, blades, bars, ropes and combinations thereof). In a preferred aspect, flexible fastening devices (e.g., belts, chains, cables, etc.) are used with the slip-lock device. In any case, the present invention offers the significant advantage of little or no fastening device or belt slippage and easy adjustment of the length of the belt or other fastening devices.

In a preferred aspect, the one or more belts and particularly machinery belts deliver the characteristics of strength and flexibility. The teeth, notches, ribs or grooves provide improved grip of the trees. Moreover, the belt conforms to the contours of the tree and can provide a 360-degree grip around the tree's girth or diameter. The belts are preferably stiff to maintain angle and thus prevent it from sagging or dropping. However, the belts are preferably flexible enough to enable bending in any direction thus providing easy movement over or around limbs or forks in trees. The belt easily will conform to small or very large trees that were before impossible to climb with traditional stands. Belts used in the invention are preferably light weight and can be coiled or wound up in a tight roll for storage on the stand or during transport of the stand. The light weight and flexibility of the belts enables construction of light weight and compact tree stands which may be handled or carried easily. Although belts typically will be flat black in color, they can be painted or camouflaged to aid in concealment. Belts for use in the invention are preferably designed for industrial specifications on moving machinery, and thus are extremely durable. Preferred belts include any belts designed to be used with motors that run blowers, fans, pumps, and many other types of industrial equipment. Such belts will be resistant to heat and withstand significant torque. Such belts also are resistant to severe weather conditions, stress and fatigue and have a long usable life typically lasting years without failure. Preferred belts are made with a variety of strands, fibers, metal filaments and/or wires embedded in rubber or an equivalent compound or polymer. In a related aspect, the multiple belt design (preferably two or more belts) offers additional advantages over other styles of tree stands. Such designs again offer light weight but the additional belts provide added strength and support. The additional belts also offer the added advantages of being able to climb past obstacles such as limbs or forks in trees. In any case, the invention avoids the need for bulky metal tubular extensions thus allowing for compact and light weight design, although tubular extensions may be used in combination with the belts of the invention. However, one belt is all that is needed to successfully attach the stand to the tree. Thus, the second belt may be used only when needed to move around or past obstacles or may be used as a spare. In addition, for the hunter, one or both belts could be used to help in dragging large game such as deer.

The simplicity of the belt grip design and/or the multiple grip design of the invention may reduce greatly the cost and time of manufacturing these stands. For the individual hunter, photographer or wildlife observer, this would prove to be a quality climbing tree stand that would be one of the lightest, most versatile, and easiest trees stands to use. Placement on the tree and climbing are made simple and easy. Moreover, it would be extremely safe because of the great strength of one or a combination of belts or other holding devices (chains, straps, cables, etc.). In a preferred aspect, the teeth, notches, grooves, etc. and flexible design of the belt provides the maximum gripping power by conforming to the tree up to 360-degrees (preferably 270-degrees) with one belt and approximately 720-degrees (preferably 540-degrees) when both belts are used. Moreover, these belts do not harm trees, leaving no damage to the bark. This is a big advantage in areas such as wildlife management zones that prohibit tree stands that use blades or spikes which have been proven to inflict damage to trees. Moreover, the belts can be used quietly to climb trees and can be quietly transported because the belt produces a very soft and natural sound when struck against another object. This in itself will prevent animals from being alerted to the presence of an individual by unnatural sounds.

The preferred belts of the invention having uniform teeth, notches, grooves, etc. provide one of the simplest yet effective methods of adjusting belt length to achieve proper angle and length. The belts teeth, notches or grooves allow small adjustments in belt length and belt locking. Typically 4 to 8, 8 to 12, 8 to 15, 15 to 20, 15 to 30, 15 to 35 or more sets of teeth, notches, grooves, etc. depending on the size and spacing of the teeth, grooves, etc. are used in the locking device of the invention. However, the number of teeth, grooves, etc. used may vary depending on the type, size and shape of the belt and its grove, teeth, etc. In a preferred aspect, the teeth, grooves, or notches are meshed together with the pressure being distributed evenly across the belt, keeping the teeth, grooves, etc. meshed together. In another preferred aspect, the locking device includes a safety feature that keeps the mechanical belt lock design from releasing. In another aspect, the locking device includes a theft proof lock such as a combination lock or key lock. Without being limited, the invention allows the force to be distributed across the teeth, grooves, notches, etc. and thus provides a strong interlocking of the teeth, notches, etc. so that separating interlocked teeth, grooves, etc. could require significant force similar to someone trying to pull a threaded screw out of a piece of wood. Another example of this teeth-meshing design would be an ordinary bolt and nut. When these two items are threaded together, they can not be separated unless the threads are disengaged by either turning the bolt or the nut away from each other.

The belts and locking devices for the invention may also be adapted to making one or more step(s) for climbing a tree or structure. In such aspect, the belt and locking device provides an anchor point for a foot rest and/or hand grip. The rest or grip may be part of or made from the belt and/or locking device. Alternatively, the foot rest or hand grip may comprise a support structure which is attached to the belt and/or locking device. In practice, by positioning the steps of the invention at different positions and elevations on the tree or pole structure (preferably at alternating positions at different elevations of the tree or pole), the invention provides a ladder for climbing the structure of interest. In one aspect, a loop in the belt provides the grip or rest while in another aspect, the locking device comprises a support for use as a grip or rest. In a related aspect, the climbing step may comprise any number of fastening devices (e.g., belts, chains, cables, pipes, rods, cords, blades, straps, bands, ropes or combinations thereof) and at least one locking device for locking, engaging or attaching the fastening device around the tree or pole. In a preferred aspect, the climbing step uses at least one slip-lock locking device to facilitate attachment and release of the step from the tree or other structure and/or at least one flexible fastening device (e.g., belts, chains., cables, etc.).

BRIEF DESCRIPTION OF THE DRAWINGS

In order that the invention may be readily understood, preferred embodiments of the invention will be described by way of examples with reference to the accompanying drawings in which:

FIG. 11b is a front view of the open channel bar embodiment shown in FIG. 11a.

FIG. 25b shows a side view plan drawing of the slip and lock design shown in FIG. 25a.

FIGS. 27b and 27b-1 respectively show a detailed side view of the same step attachment shown in FIG. 27a (left) and a front view of the same design (right).

DETAILED DESCRIPTION OF DRAWINGS

Figure 1:
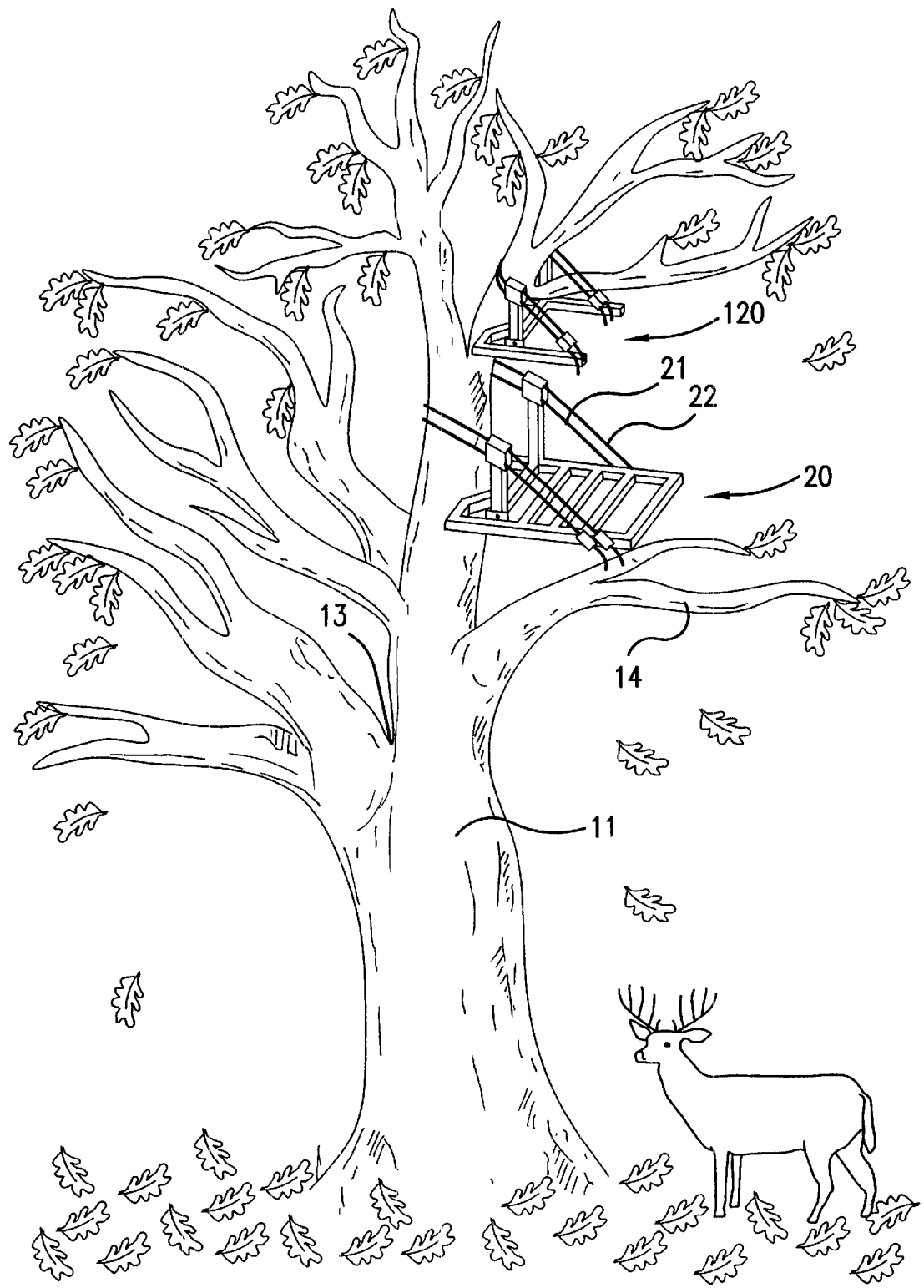
FIG. 1 is an isometric drawing of a tree stand and climbing device shown on a tree which exhibits a large diameter, a fork, and limbs on which such embodiments are attached.

FIG. 1 shows a climbing tree stand 20 and hand climbing device 120 of like nature placed on a large tree 11 which exhibits a large base diameter, forked main branches 13, and numerous limbs 14. FIG. 1 represents an actual condition that would occur in hunting, observation, or wildlife photography, where a large tree with limbs could be climbed with the multi-belt tree stands of the invention.

Figure 2:
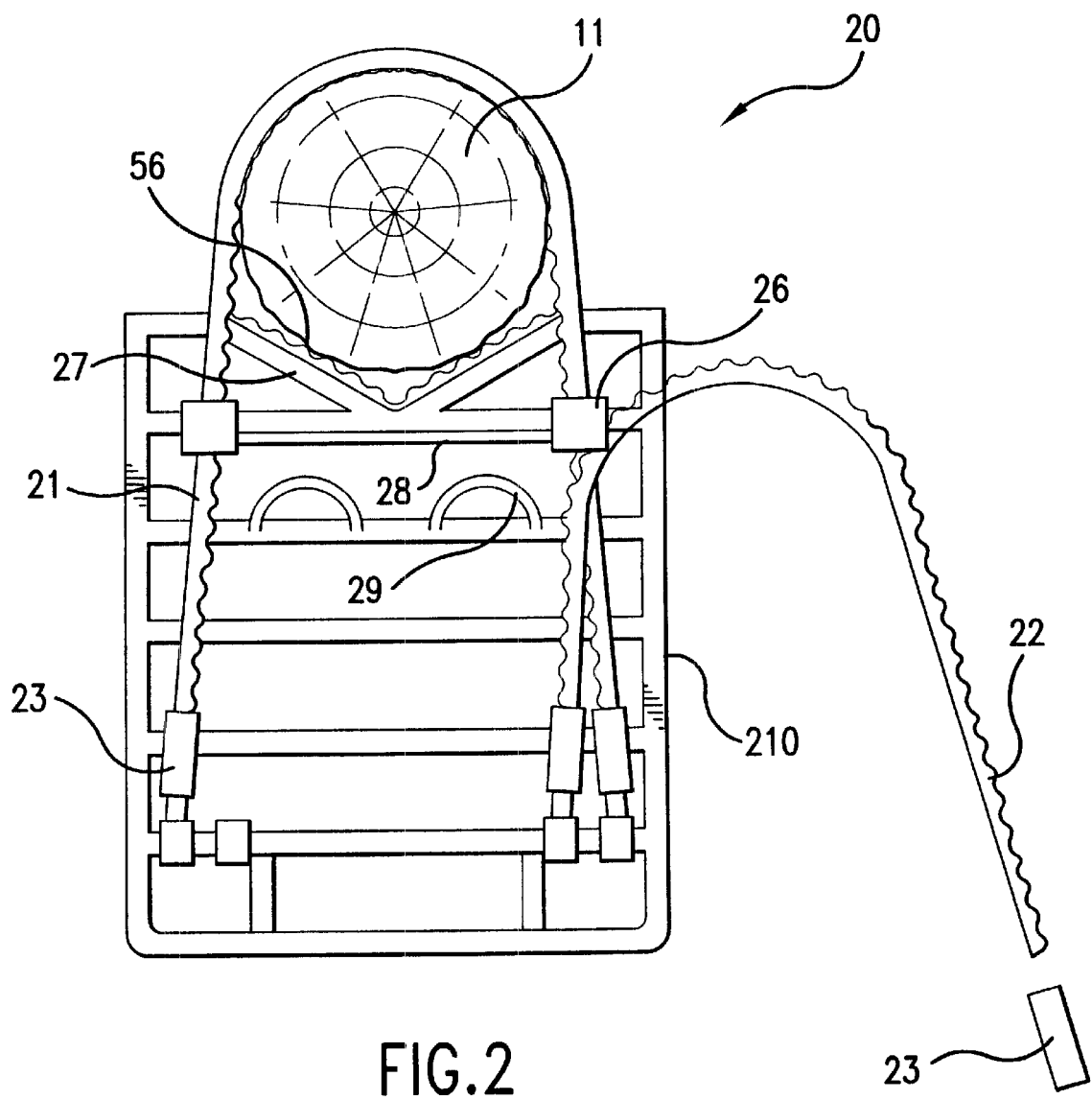
FIG. 2 is a top plan view of one example of the main embodiment showing a platform with optional foot straps and one belt attaching the platform to the tree with the optional second belt disconnected.

FIG. 2 shows an tree stand 20 attached to a tree 11 with the use of one belt 21 which is connected to the platform 210 by one or preferably more locking devices such as the loop and lock device 23. The belt 21 is preferably positioned at an angle relative to the platform 210 using belt guide 26 to efficiently attach the platform to the tree 11. The belt guides 26 may be connected by a supporting structure 28 to keep the angle arms/belt guides in a fixed position as the belts are used to attach the platform 210 to the tree 11. Belt angle relative to the platform may also be maintained by using supports (e.g., rods, tubular bars, bars, pipes, etc.) which extend from the platform at a desired angle toward the tree to which the belt of the invention may be attached. The platform 210 comprises at least one contact point 56 where the platform contacts the tree 11. Such contact point may be made of any structure or material which allows the platform to contact the tree 11 with little or no slippage such as blades, spikes, rubber, etc., although such contact point 56 preferably comprises one or more belts of the invention. The contact point may be any shape such as semi-circle, oval or angled to maximize contact with the tree. FIG. 2 shows the use of portions of a belt having uniform teeth as the contact point 56. Preferably the contact point 56 is formed by two angled supports 27 to minimize slippage between the platform 210 and the tree 11. A second belt 22 may optionally be used as is belt 21 for attaching the platform 210 to tree 11. The platform frame of FIG. 2 preferably consists of 1-inch hollow square aluminum metal or other tubular bars or rods and is arranged to provide a secure and stable platform, although other platforms may be used which are constructed from various materials or combinations of materials (e.g., wood, plastic or other polymers, metals or metal composites, fiber or fiber composites, etc.), in various configurations (e.g., solid base structure, frame base structure, cage base structure, etc.), and in various sizes and shapes depending on the need. Other designs shown with a frame made of 1-inch square aluminum can be seen at least in FIGS. 2, 5, and 6. However, the size and shape of the aluminum or other metal in the frame may vary depending on the need. FIGS. 1, 2, 3, 5, 7, 12, 14, 15, and 17 show the use of two industrial belts 21 and 22 which provide the gripping concept for such embodiments. The belts 21 and 22 are preferably comprised of uniform teeth, which provide maximum grip and enable an easy adjustment and belt lockdown systems.

Figure 8A:
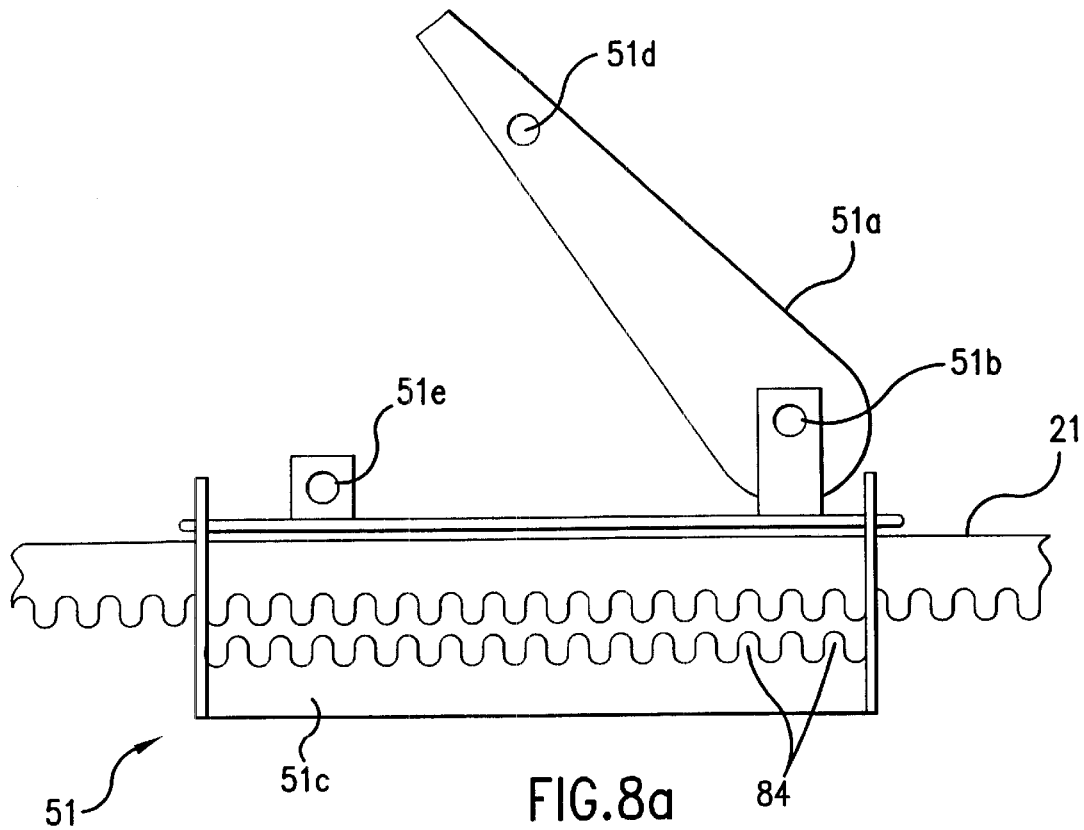
FIG. 8a is a side view which shows one style of a mechanical lock down device that is used to clamp the belt embodiment to the frame or platform. The design is shown in the open position allowing the belt embodiment to slide to the desired length. This design may be called slide and lock.
Figure 8B:
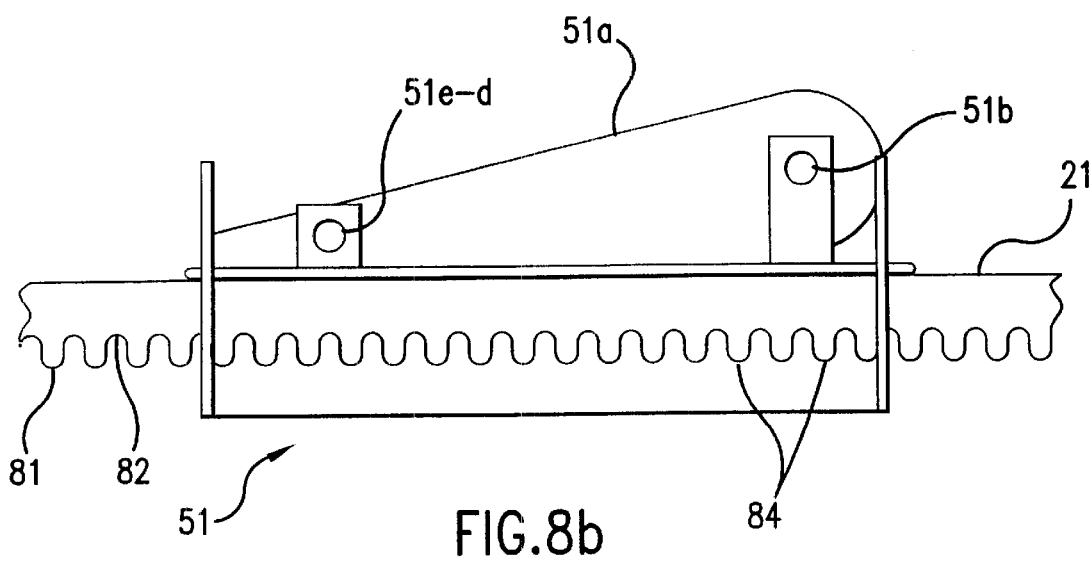
FIG. 8b shows the same design of the mechanical lock down device in FIG. 8a in a closed or locked down position.
Figure 9A:
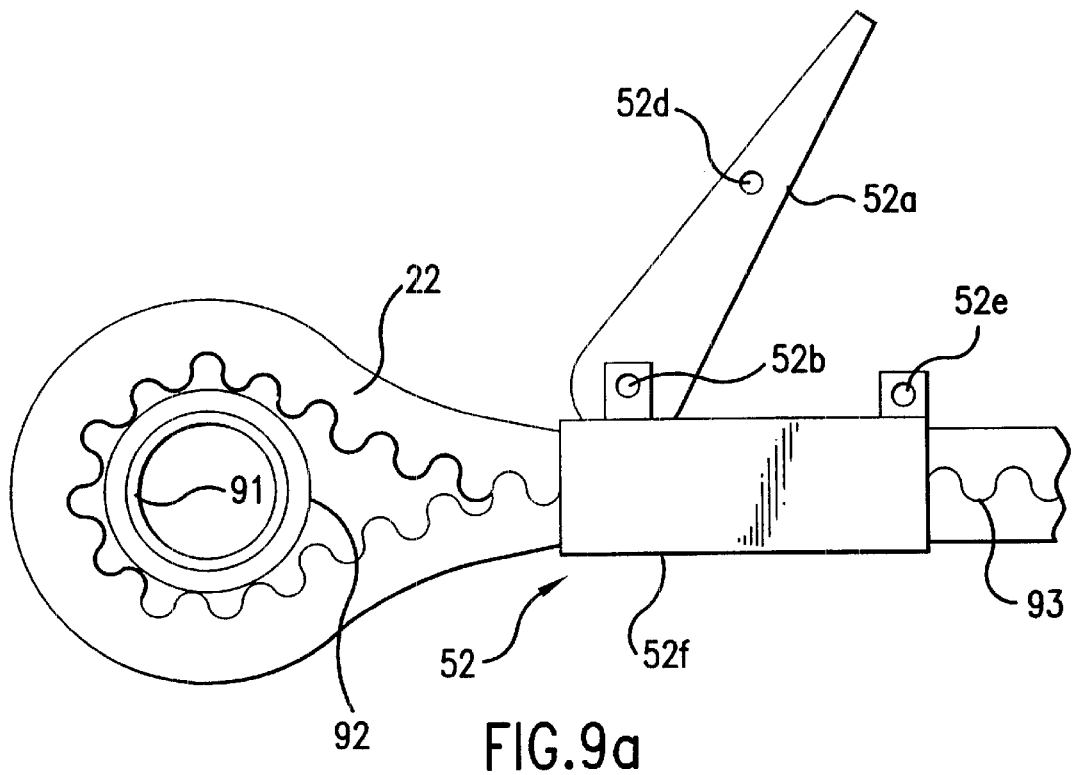
FIG. 9a is a side view which shows another embodiment for locking the belts together. This design may be called loop and lock design.
Figure 9B:
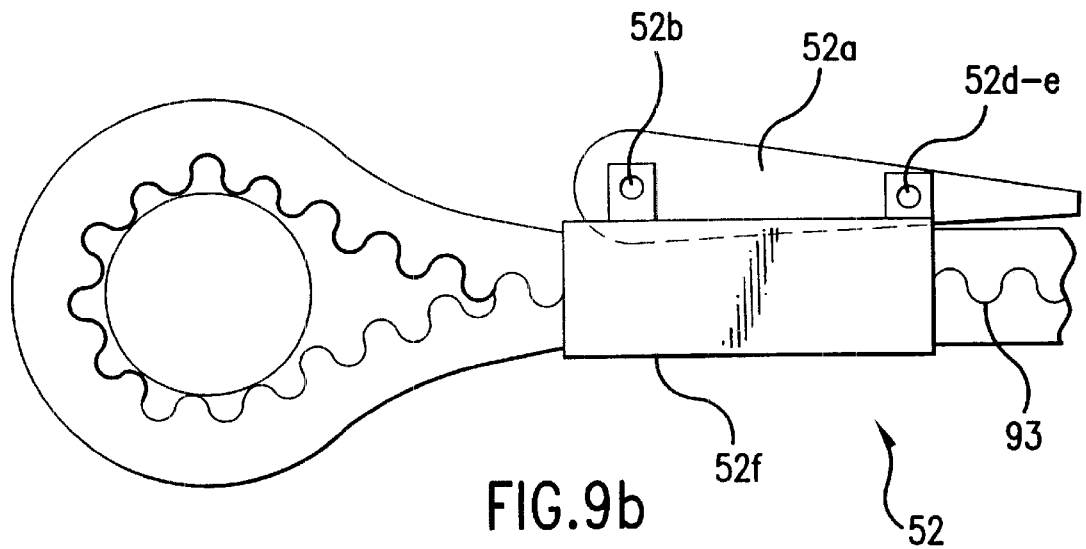
FIG. 9b shows the same design as in FIG. 9a in which the mechanical lock down device is closed or locked.
Figure 10A:
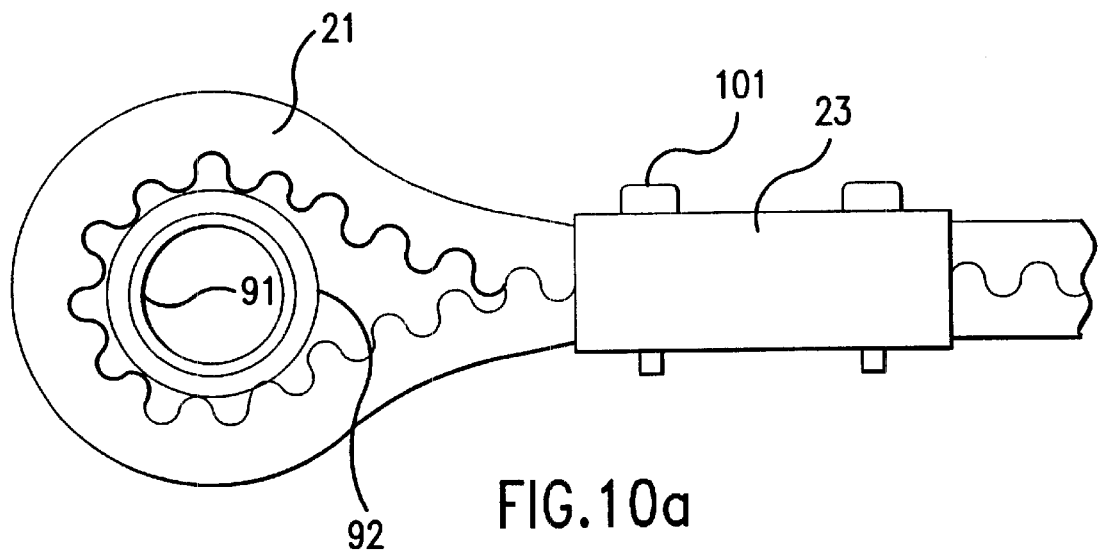
FIG. 10a is a side view which shows a similar lock down device as shown in FIGS. 9a and 9b which uses a opened channel bar as a clamp down device.
Figure 10B:
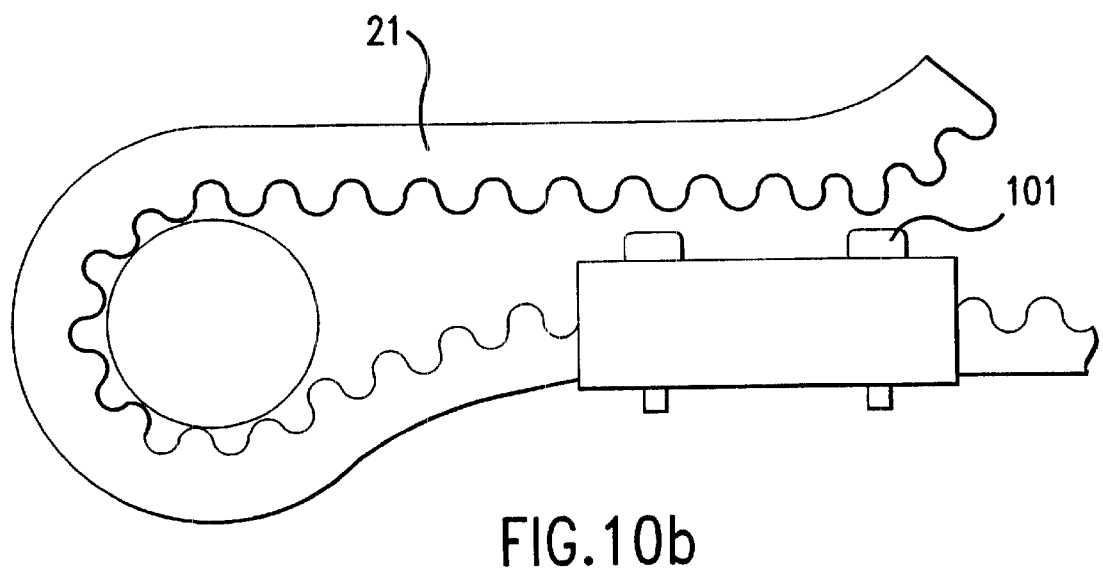
FIG. 10b shows the same embodiment as in FIG. 10a with belt teeth disengaged.
Figure 11A:
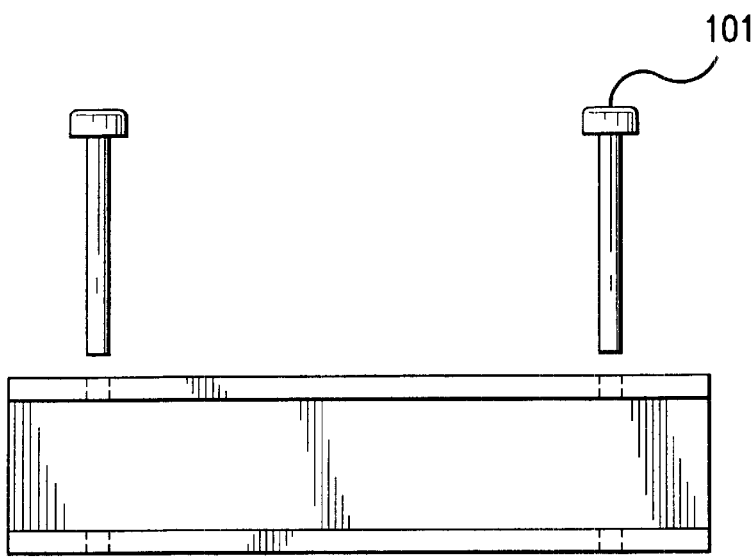
FIG. 11a is a top plan view of the open channel bar embodiment as shown in FIGS. 10a and 10b.
Figure 11B:
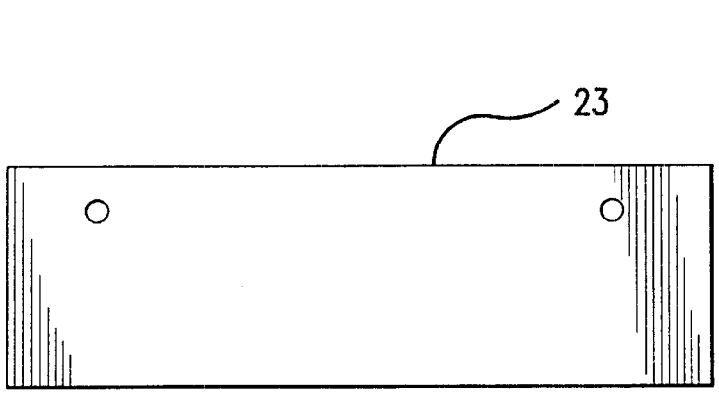
Figure 11C:
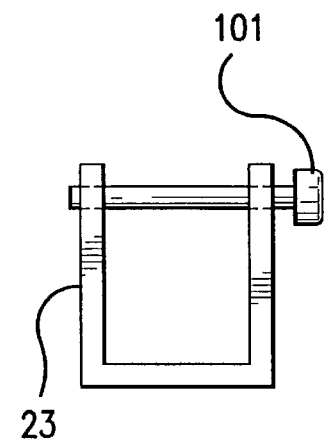
FIG. 11c is a side view of the open channel bar embodiment shown in FIG. 11b.
Figure 17:
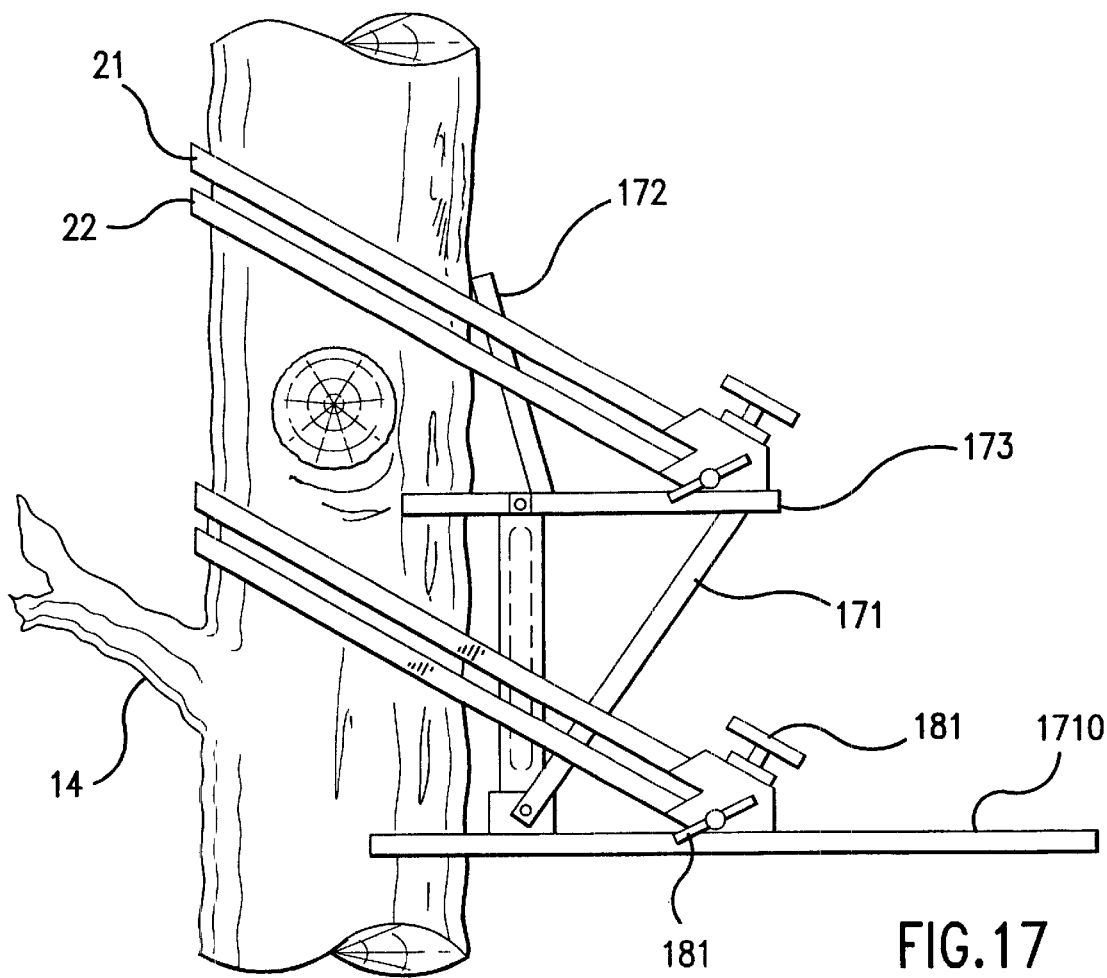
FIG. 17 shows a side elevation view of a stand and climber combination with a dual belt design with belt adjustment and lockdown assembly involving adjustable pulley and tri-pin lock assembly.
Figure 18:
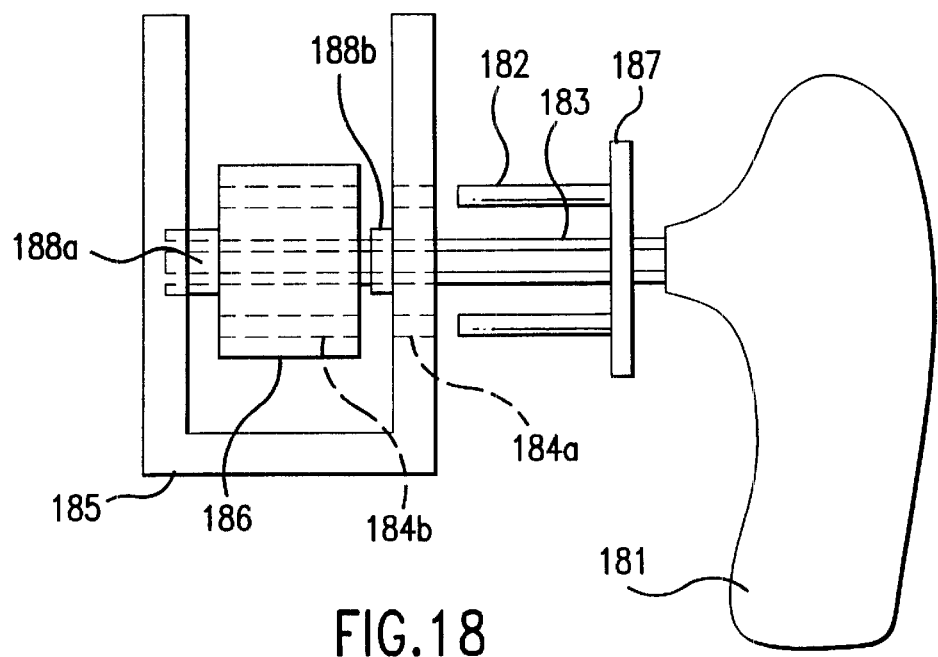
FIG. 18 is a side drawing view design of a single pulley, T-style handle, allen wrench adjustment design, with lock pin assembly.
Figure 21:
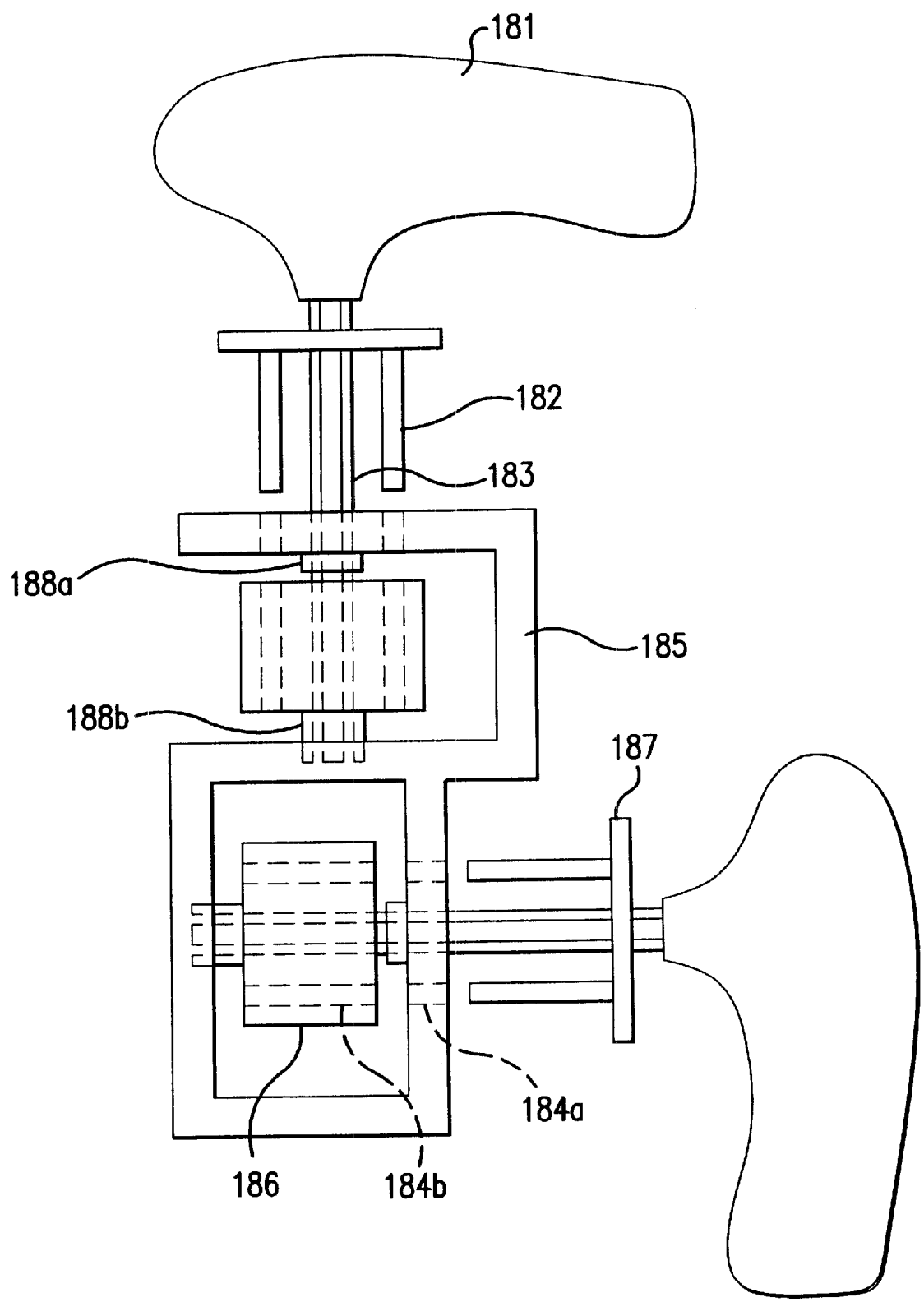
FIG. 21 shows a dual design of the same embodiment shown in FIG. 18.
Figure 22:
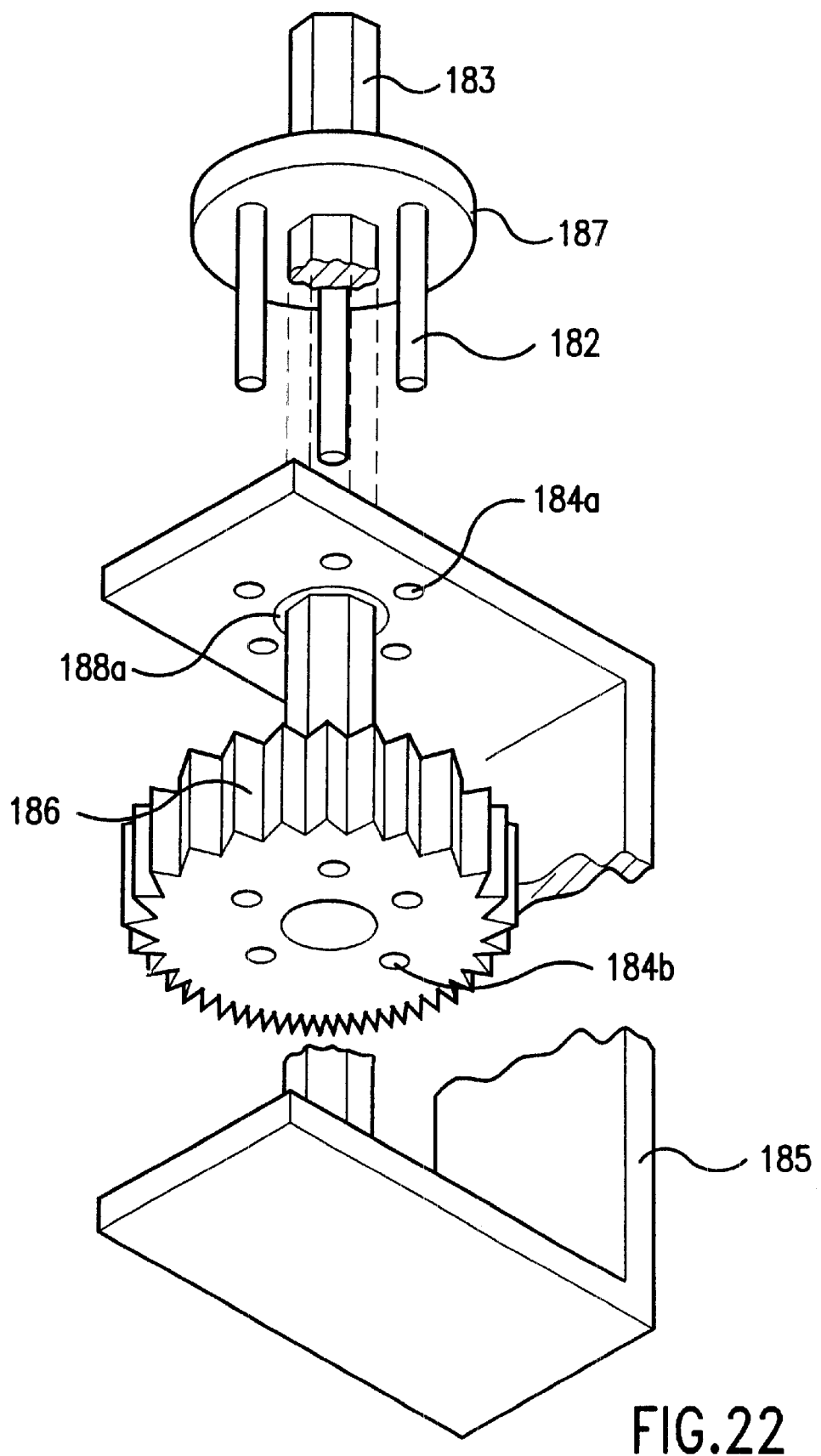
FIG. 22 shows a fragmentary perspective view of the embodiment shown in FIG. 18.

The locking device used in any of the embodiments may include loop and lock design (FIGS. 9 and 10), the slide and lock design (FIG. 8), the pulley lock design (FIGS. 18, 21, 22), the slip-lock design (FIG. 25) or any other design to allow adjustment of belt length and for locking the belt in place when the desired length is achieved. The loop and lock design (FIGS. 9 and 10) allows the belts to be looped around a cylindrical rod 91, which is preferably surrounded by a pulley or roller 92. This roller allows the belt to slide with ease around the cylindrical rod, when adjustment is to be made. Only one belt is typically undone at a time when needed. This is done to adjust the angle maneuvering around limbs or adjusting to fit tree girth. Leaving one belt fastened all of the time ensures safety while adjusting belts. FIG. 9a shows the belt mechanical lock down device 52 in an unlocked state where lever handle 52a pivots at point 52b on bar 52f and while in the open position releases pressure allowing the engaged teeth 93 of the belt to disengage or allows the belt to move through the bar 52f. When this lever is closed as shown in FIG. 9b, the pin or lock hole 52d is aligned with the hole 52e allowing for a safety lock pin to be inserted. In the closed position, the teeth mesh together or engage 93 as shown in FIG. 9b and prevent the belt from moving. Another embodiment of the loop and lock design (FIG. 10) incorporates an open faced, square bar preferably constructed of metal although any other material may be used such as plastic or other polymer, composite material and the like. The open channel of the bar allows it to fit snuggly over the belts meshed together. FIG. 10a shows a bar lock down device 23 where belt 21 is looped around the optional cylindrical rod 91 and roller or pulley 92 in a locked-in position with pins 101 engaged such that the teeth of the belt 21 are engaged. 10b shows the belt in an unlatched position. FIG. 11 shows the open bar lock down device 23 with pins 101 without the belts. FIG. 8a shows a slide and lock down device 51 in the unlocked position where the lever handle 51a pivots at point 51b such that the teeth of the belt 21 and the corresponding teeth of the locking device 84 are disengaged. The teeth 84 of the locking device may be formed or carved into the device (such as a machined piece of metal 51c (e.g., aluminum), plastic or other material) or may be constructed from a portion of a belt having corresponding teeth. In the locked position (FIG. 8b), the hole 51d aligns with hole 51e so that a safety pin can be inserted. In the closed position, the teeth 81/82 of the belt 21 engage the teeth 84 of the device 51. When lock pinhole 51d and 51e or 52d and 52e (FIGS. 8 and 9) are aligned, a safety lock pin is inserted or a lock can be used to prevent theft of the stand if left on the tree. The pins 101 (FIGS. 10 and 11) may also be replaced with one or more locks if desired. Lock pins or locks allow the locking device to maintain constant pressure distribution across the belt teeth and thus prevents belt slippage and maintains attachment of the stand or climber to the tree. Generally, an anti-theft lock(s) (e.g., key or combination lock) can be used in combination with any of the locking devices of the invention to prevent theft of the stand or steps of the invention, thus allowing an individual to leave the device in place for an extended time. FIGS. 18, 21 and 22 show the pulley lock design which comprises generally a shaft 183 connecting a handle 181 and a belt engaging rod, gear or pulley 186, which may comprise teeth, grooves, etc. to conform to the belt used. Such pulley design may further comprise one or more locking pins 182 (preferably evenly spaced if two or more) which allowing locking of the rod, gear or pulley 186 by turning the handle 181. Such locking pins 182 are preferably mounted on a plate 187. In a preferred aspect, the shaft 183 may slide (by pulling/pushing the handle) allowing the pins to engage or disengage the pin holes 184a and 184b. Alternatively, the pins 182 may slide along the shaft 183 to engage or disengage the pin holes 184a and 184b. Preferably, the rod, gear or pulley 186 comprises teeth, grooves, etc. corresponding to the teeth, grooves, etc. on the belt. In another aspect, bushings 188a and 188b allow the shaft 183 to turn freely. In another aspect, the locking device may be designed in a multiple device format as shown in FIG. 21. In such multi-locking device format, multiple belts can be used and adjusted in the stand of the invention such as shown in FIG. 17. In the lock down devices of the invention, approximately 3 to 20 sets of teeth are preferably used to prevent slippage although any number of teeth may be engaged depending on the type of teeth, grooves, etc. and depending on the type of belts used.

Referring to the belts 21 and 22, these belts are preferably designed for industrial applications requiring great strength and endurance. The belts are flexible, quiet, light and provide the improved gripping of the structure (e.g. tree) to be climbed. In a preferred aspect, belts 21 and 22 are made of high strength rubber compounds, inner lined with strands of various materials, fibers, and/or stands of metal wiring which strengthen the belt. The teeth 81 and 82 (FIG. 8b) preferably form peaks and valleys of uniform size which allow the belt to be firmly locked by a locking device. When the belt is not meshed in locking device 23, 51, or 52 (FIGS. 8, 9 and 10), the valleys allow for the belts to bend and flex with ease allowing them to move around and provide easy adjustment. This flexibility of belts 21 and 22 also allows the belts to conform to the surface diameter of the tree, thus providing maximum gripping power for trees with unusual shaped trunks. Two belts allow the user to move around limbs, forked trees, etc. According to the invention, the teeth, groves, etc. of the belt may face and contact the tree or may face away from and not directly contact the tree.

Figure 5:
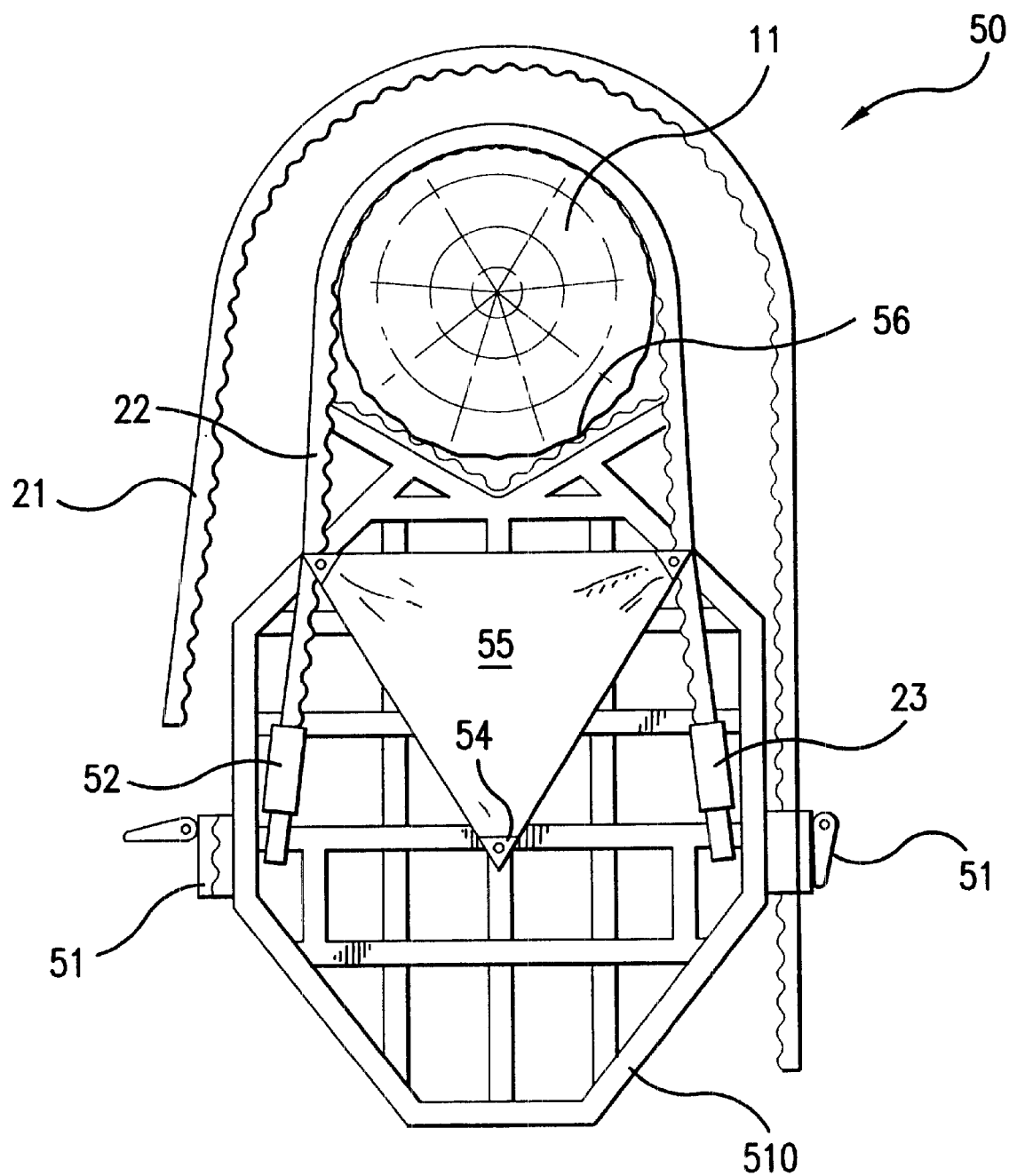
FIG. 5 is a top plan view of a different design of the main stand embodiment with a triangular style attached seat.
Figure 6:
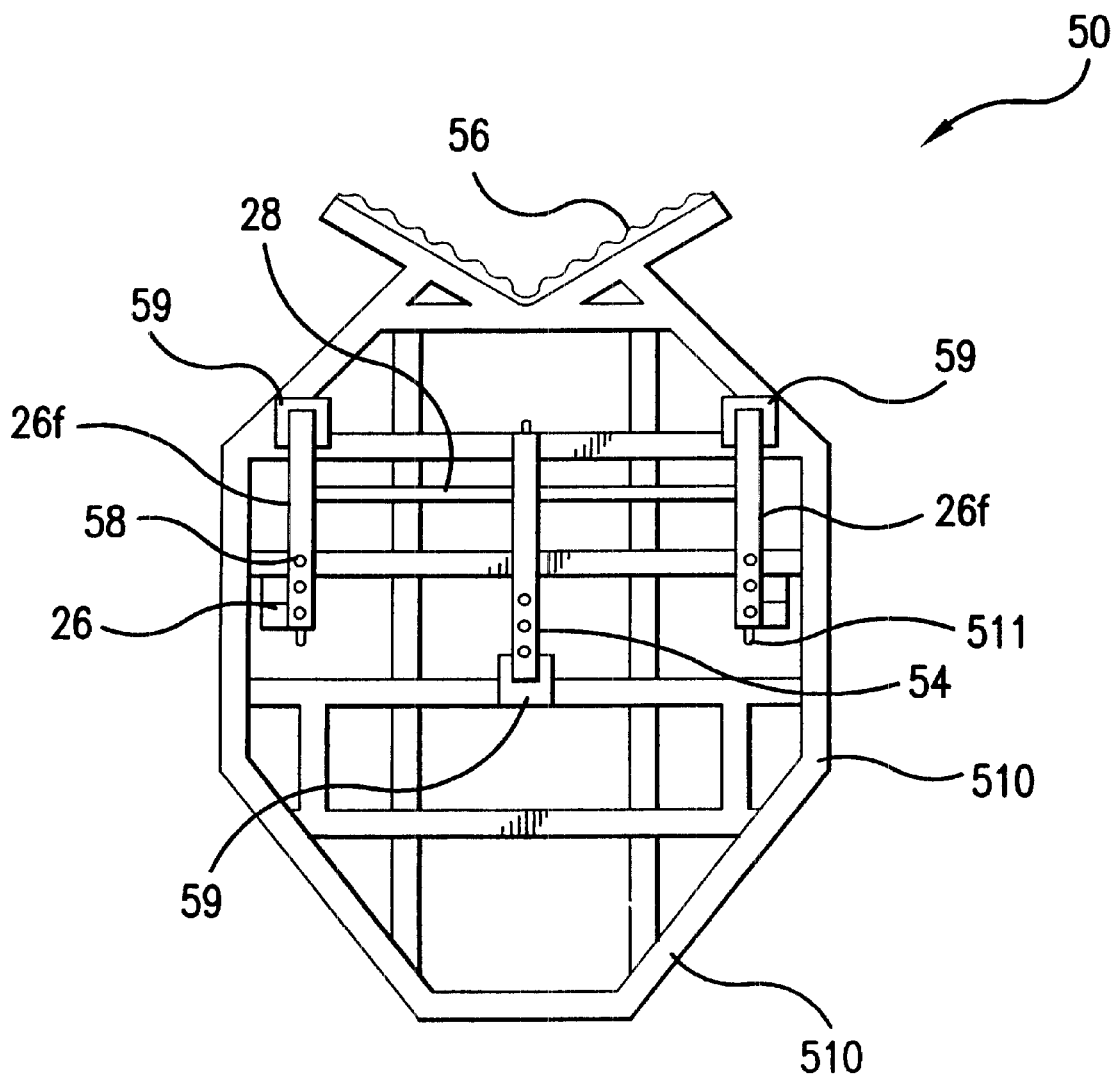
FIG. 6 is a top plan view of the same embodiment as in FIG. 5 showing seat design in a folded position.
Figure 7:
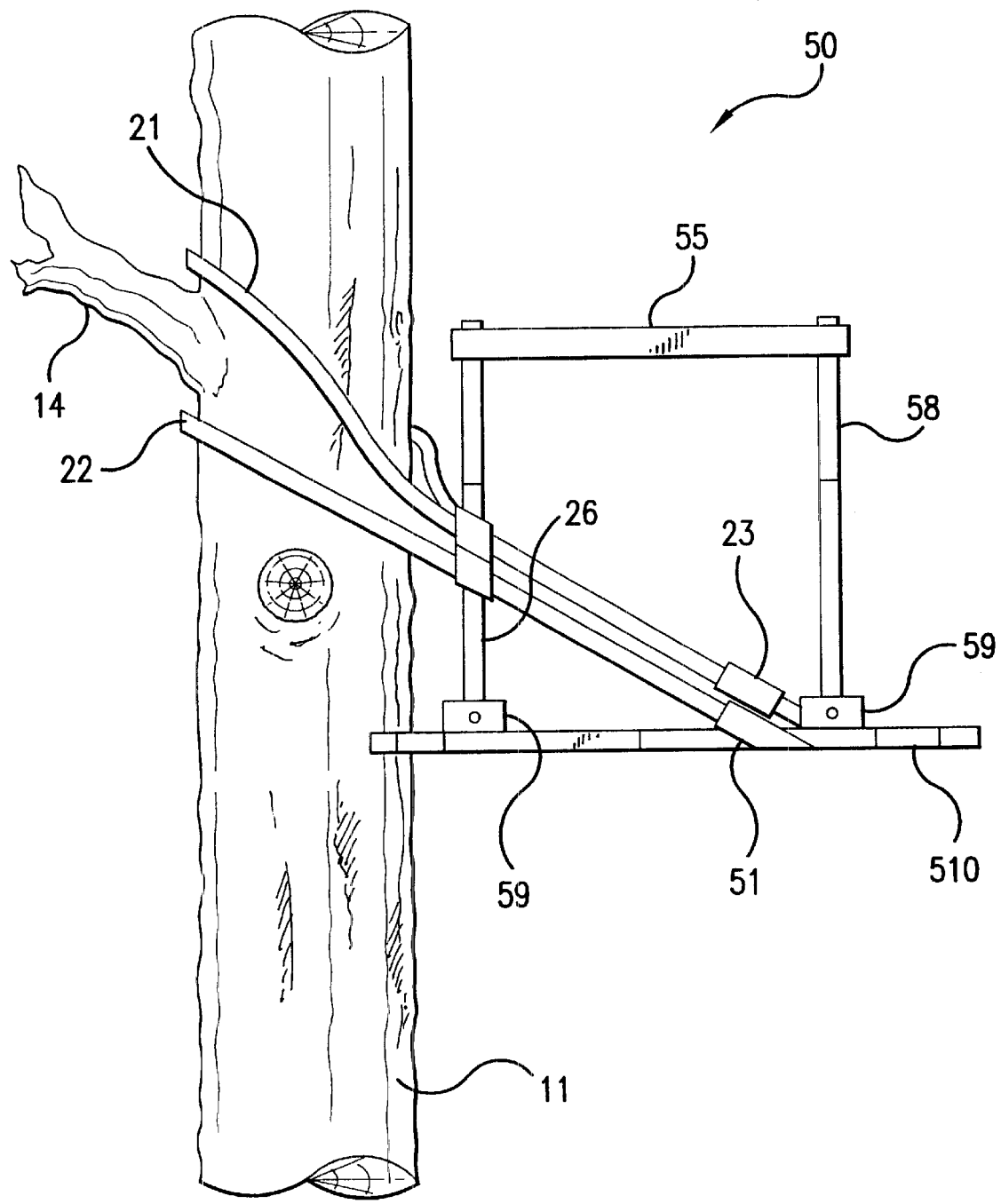
FIG. 7 is a side elevation of FIG. 5 attached to a tree with triangular seat extended.

FIG. 7 shows an application of the invention to move past or over an obstacle such as a branch or limb 14. In such application, belt 21 being uncoupled is placed over the limb and then reconnected to a locking device 23. Belt 22 may then be disengaged from its locking device 51 and moved above branch or limb 14. The procedure is reversed when descending the tree. In more detail, FIG. 7 shows a stand 50 comprising two belts 21 and 22 with a triangular seat 55 attached to the platform 510 by supports 58. The supports 58 may pivot at points 59 allowing the seat 55 to move into a folded position. The stand 50 also comprises locking devices 51 and 23 for adjusting and locking the belts 21 and 22. The stand 50 is shown attached to a tree 11. FIG. 5 shows the top view of the stand in FIG. 7 having a platform 510, two belts 21 and 22 for attaching the stand 50 to tree 11. The platform comprises locking devices 51, 52 and 23 and a seat 55. FIG. 6 shows the seat in the folded position on the platform 510.

The triangular seat 55 provides maximum comfort allowing no pressure points to be in contact with the individual and distributes weight evenly. The seat flap is connected to short rods 511 in FIG. 6. The extension arms 26f and belt guides 26 that are located in the rear of the stand having pivot points 59 which are connected by a support rod 28 provide support extensions for the seat 55. The center extendable portion 54 having pivot point 59 provides the third support extension for the seat 55. In function, the support extensions fold up and completes the seat triangle arrangement. Spring loaded buttons 58 (FIG. 6) allows adjustment of the length of the supports 26f and 54 and will lock the height of the seat and give an adjustment means to aid in selecting the most comfortable sitting arrangement. The back of the stand 56 serves as the contact point for the tree.

Figure 3:
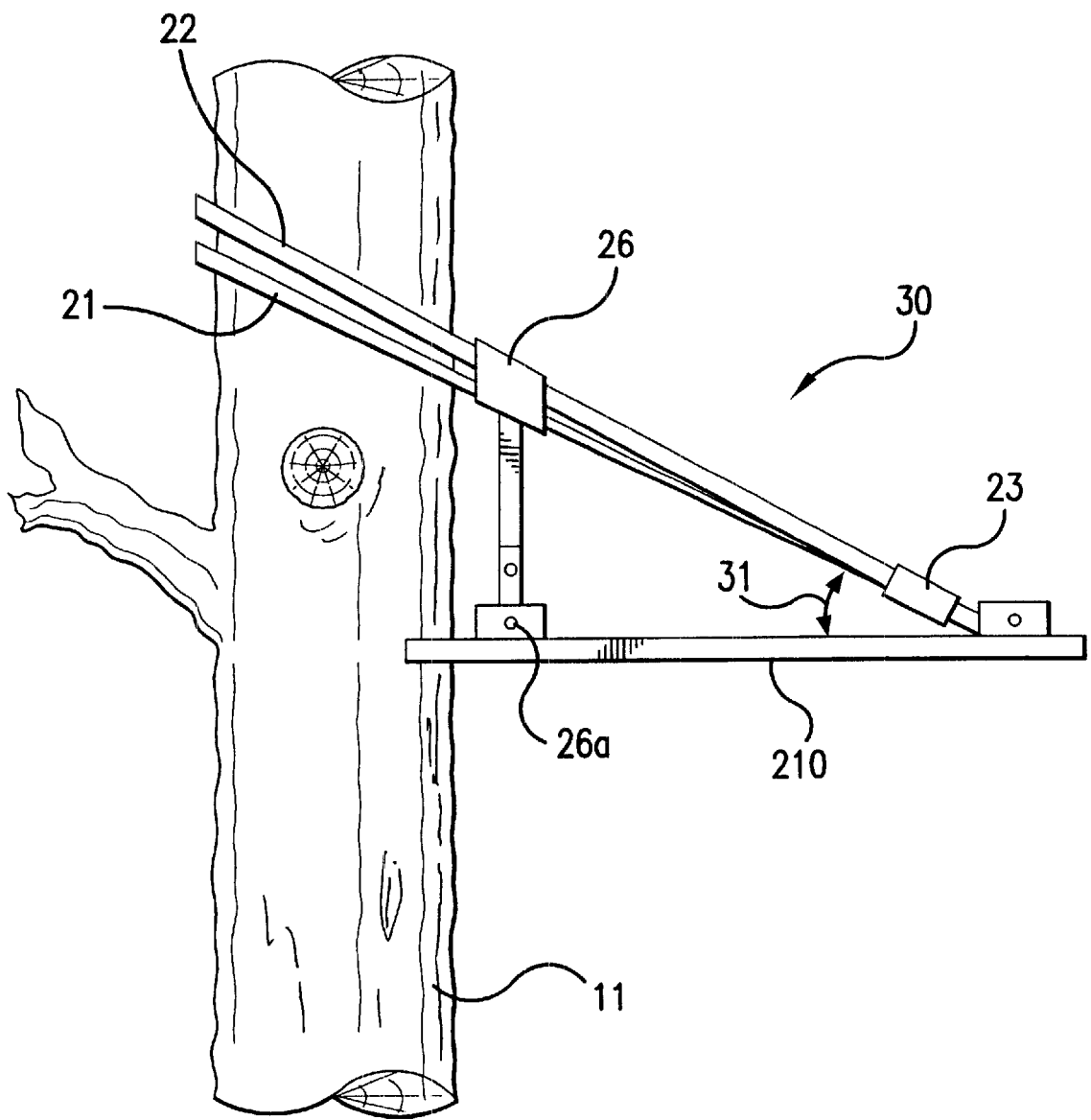
FIG. 3 is a side elevation view of FIG. 2 with both belts connected to the tree.
Figure 4A:
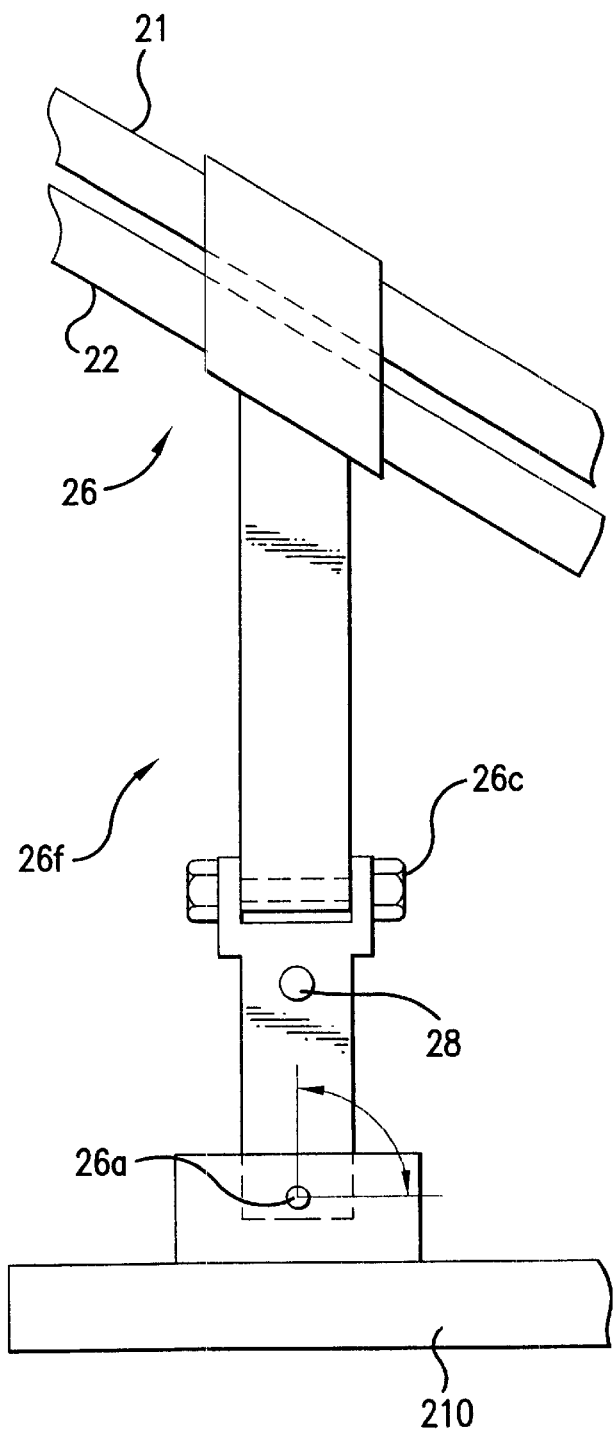
FIGS. 4a and 4b respectively show a side elevation and front elevation detail of the angle arm and belt guide in FIG. 3.
Figure 4B:
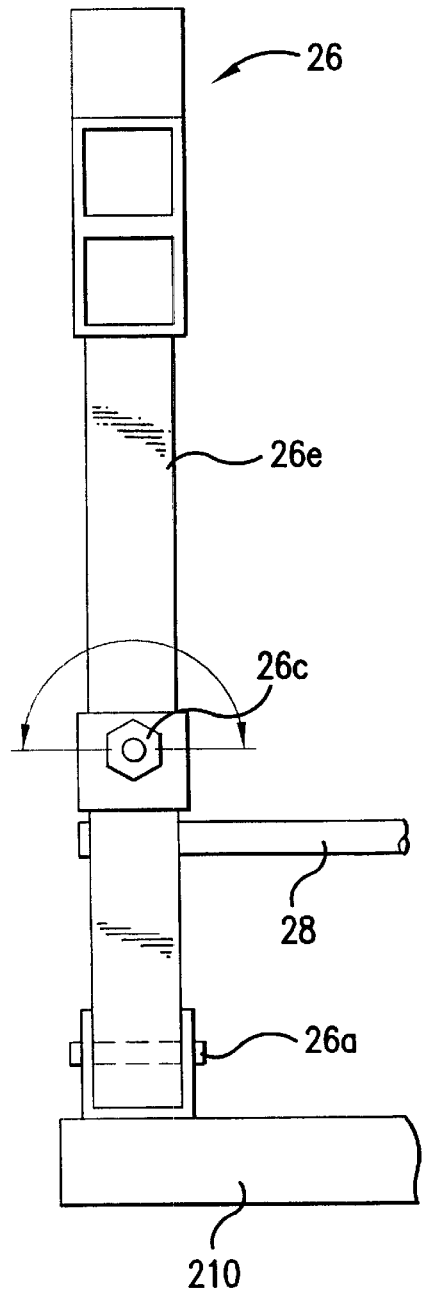
Figure 13:
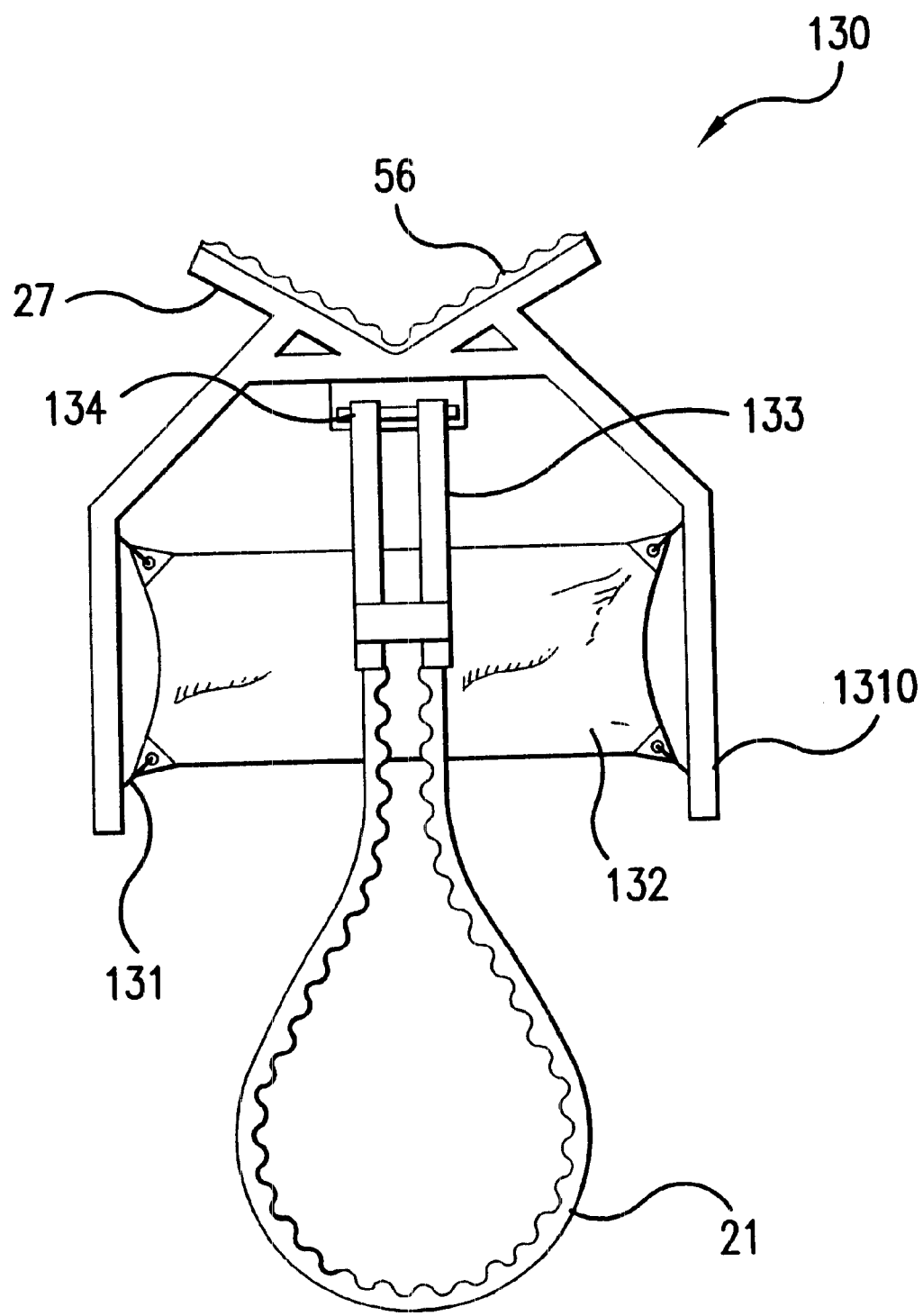
FIG. 13 shows a top plan view of a hand climber comprising a different single belt grip design. The belt is shown folded in compact form allowing easy transport and storage.
Figure 14:
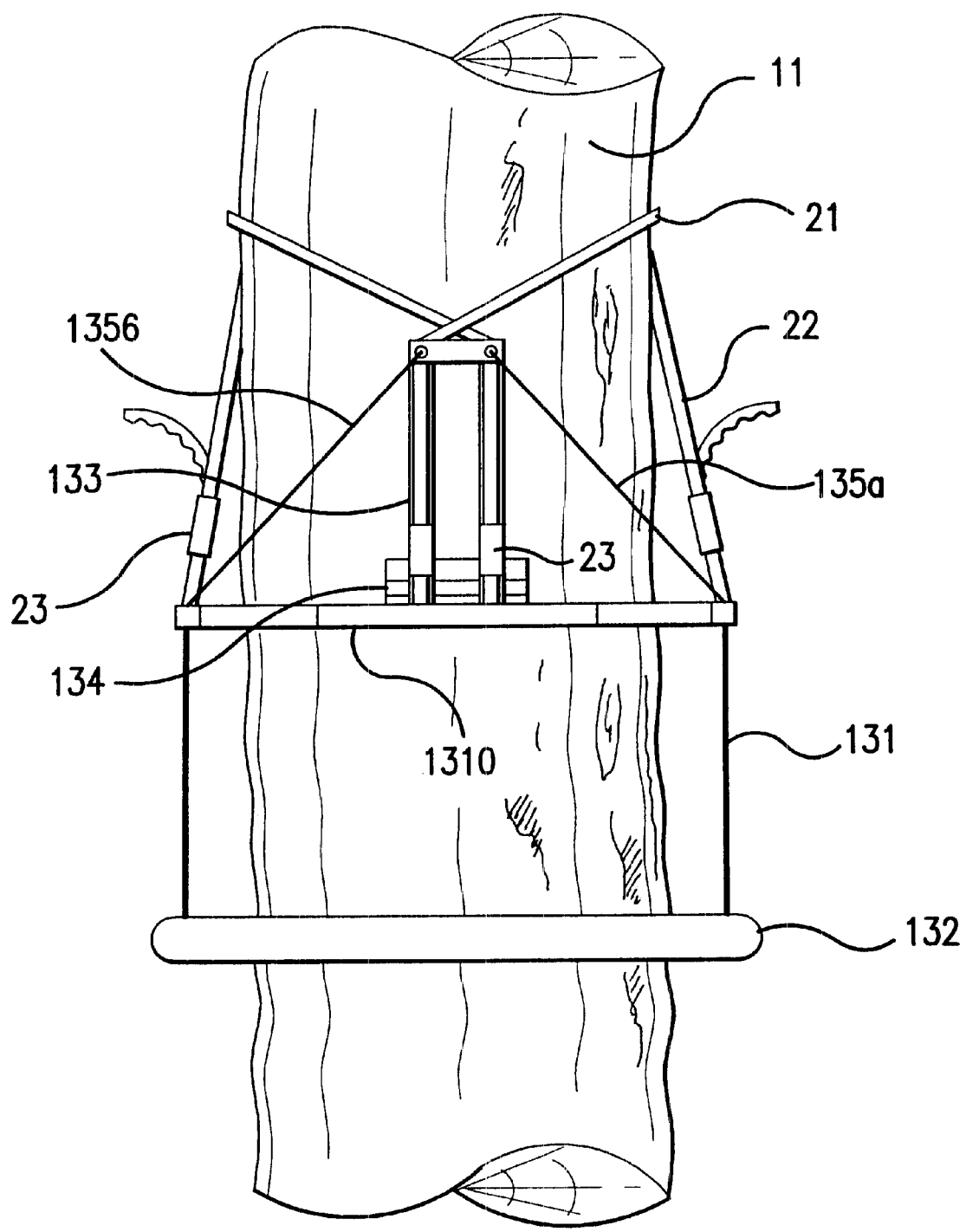
FIG. 14 shows a front view of an alternate embodiment of a hand climber comprising a seat and a dual belt design.

FIG. 4 shows one embodiment for maintaining the angle of the belt relative to the stand platform 210. The belts 21 and 22 are threading through belt guides 26, which are on extended arms 26f (e.g. angle arms) preferably made of aluminum square tubing. These angle arms 26f and guides 26 are preferably mounted to the stand platform and maintain the angle between the stand platform and the belts extended around the tree. This angle 31 can be measured as shown in FIG. 3. Varying the length of the angle arm will vary the angle 31. Preferably, the angle 31 ranges from about 5 to 75 degrees and most preferably about 20 to 60 degrees. The optimum angle can readily be determined by those skilled in the art and will depend on the distance of the belt from the platform to the tree. A detail is shown of an angle arm 26f and guides 26 in FIG. 4 in which the angle arm 26f is allowed to pivot at two points 26a and 26c. Pivot point 26a allows the arm to be folded flat against the stand for storage or transport, while 26c allows the upper extension 26e that contains the belt guides 26 to flex inward or outward to allow the belt to better conform to the tree and maximize belt gripping at the sides of the tree. A supporting structure or rod 28 may connect two of the angle arms 26f located on each side of the platform to provide added support and allows the angle arms to be moved in unison at pivot point 26a. An example of angle arms 26f and guides 26 is shown in FIGS. 2 and 3. In another aspect, the angle arm is fixed in place (e.g., welded firmly) but preferably has one or more pivot points that would allow it to fold or move in various directions. In another style of angle arm, the angle arms are located near the center of the platform, (see FIGS. 13, 14, 15 and 16) rather that at or near the sides of the platform (see FIGS. 2 and 12). Thus the angle arms 133 being nearer to the center of tree allows about 360-degree belt wrap as shown in FIGS. 14 and 16. Such center positioned angle arms may also contain a pivot point 134 for storage and transport as shown in FIG. 13 where the single belt 21 is folded flat. The pivot point 134 allows angle arms 133 to fold flat against the frame 1310 (compare FIGS. 13, 14, 15 and 16).

Figure 12A:
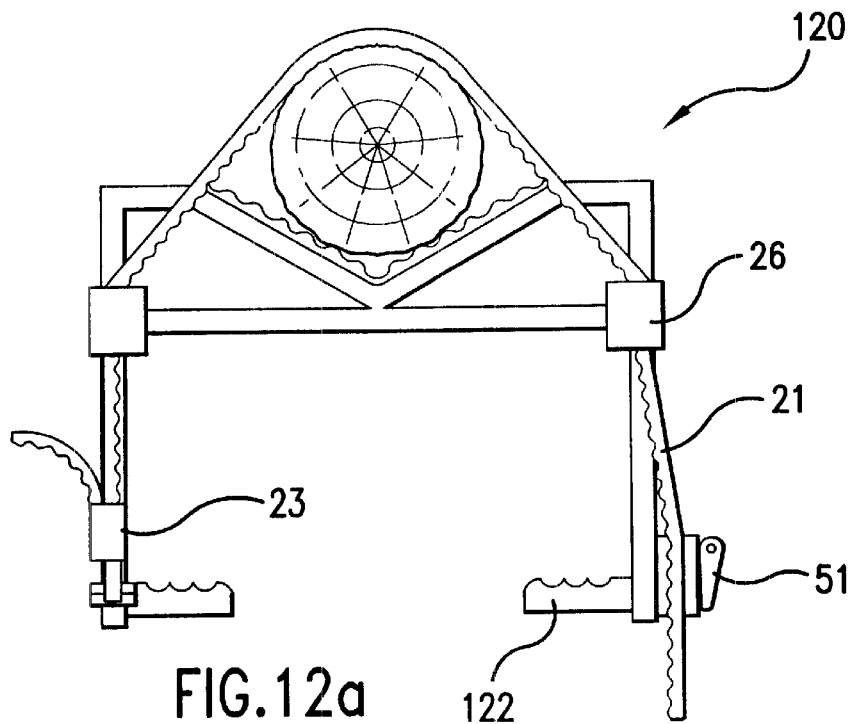
FIG. 12a shows a top plan view of a design for a hand climber using one belt for attaching the climber to the tree.
Figure 12B:
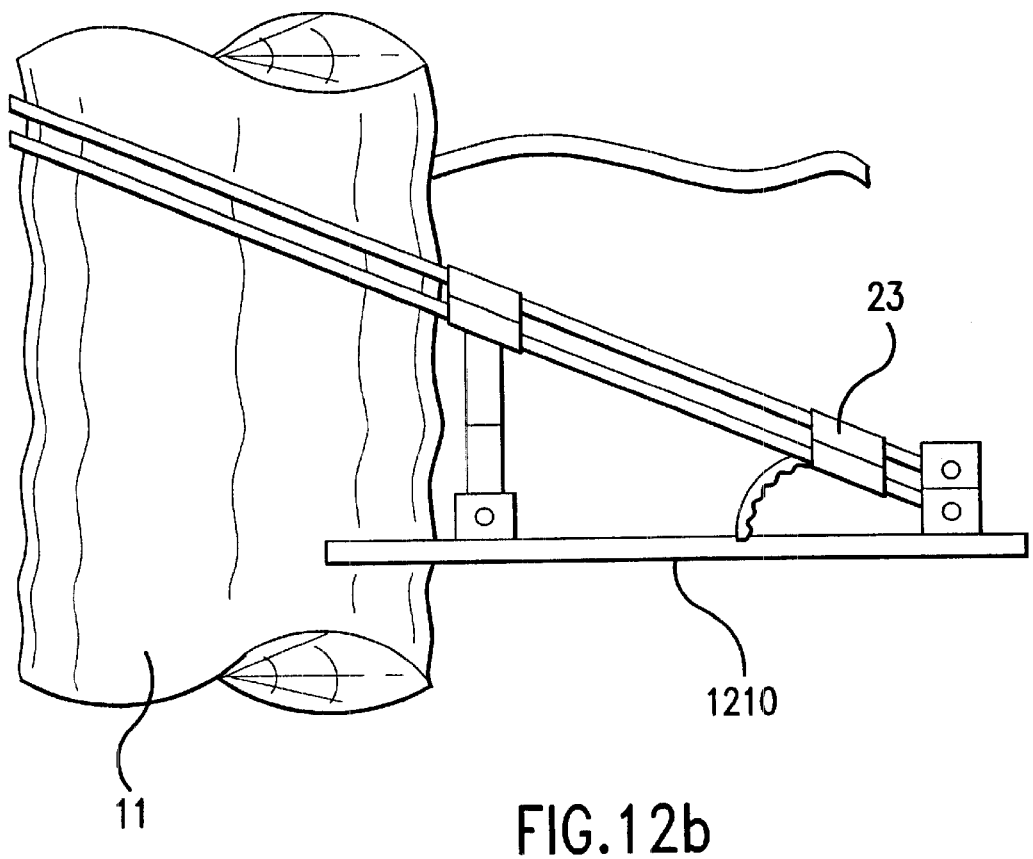
FIG. 12b shows a side view elevation of the embodiment shown in FIG. 12a using two belts to connect the climber to the tree.
Figure 12C:
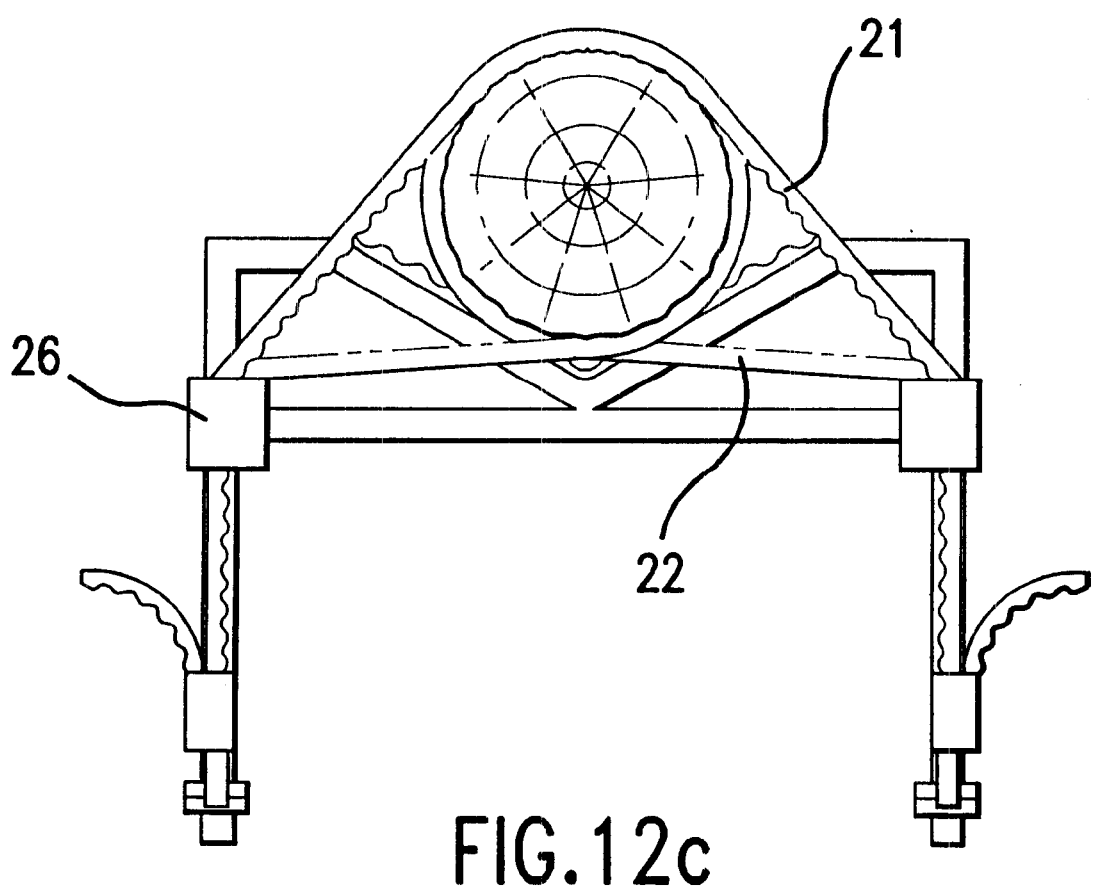
FIG. 12c shows a top plan view of the same embodiment shown in FIGS. 12a and 12b showing both types of belt grips.

FIG. 12 shows various hand climbers of the invention in both single (FIG. 12a) and double belt (FIGS. 12b and c) designs. In FIG. 12a, locking devices 23 and 51 allow adjustment and locking of belt 21 around the tree for attachment of the climbing device 120 to the tree. Angle arm or belt guide 26 allows appropriate angle of the belt for efficient attachment of the climber 120 to the tree. Handles 122 allows the individual to grip the climber when ascending or descending the tree. FIG. 12b shows a side view of the dual belt climber attached to a tree 11 having lateral supports 1210 for attaching the belts with locking device 23. FIG. 12c shows the hand-climbing device with both belts 21 and 22 attached to tree. Belt 21 in FIG. 12c is extended from one side, extending around the backside of the tree and connected on opposite side. Belt 22 is extended from the inside, wraps 360-degrees around the tree and attaches to the opposite side. Other figures referring to this 360-degree-belt concept include 14, 15a, 15b, and 16. FIG. 14 demonstrates a combination of the two different belt attachments. This provides close to 540-degrees of total belt attachment around the circumference of the tree, thereby providing maximum safety and gripping power.

FIG. 13 shows a climber in compact form (angle arms 133 folded at pivot point 134) while FIG. 16 shows the same climber attached to a tree by belt 21. These embodiments comprise a seat 132 attached to the lateral supports 1310 by four connections 131 (e.g., metal cables). Angled bars 27 and portions of belts 56 comprise the platform contact point for the tree. Supports 135a and 135b on the angle arms 133 connect to the lateral supports 1310 which allows a stable and secure embodiment while attached to the tree and when weight is applied. Such supports are also shown in FIG. 14.

FIG. 14 shows a two belt design climber attached to structure 11 with center angle arms 133 having locking devices 23 to lock belt 21 and supports 135a and 135b to support the angle arms. The angle arms 133 also comprise a pivot point 134. The climber also comprises a seat 132 with connections 131 to connect seat 131 to lateral supports 1310. Additional locking devices 23 are located on lateral supports 1310 to lock belt 22.

Figure 15A:
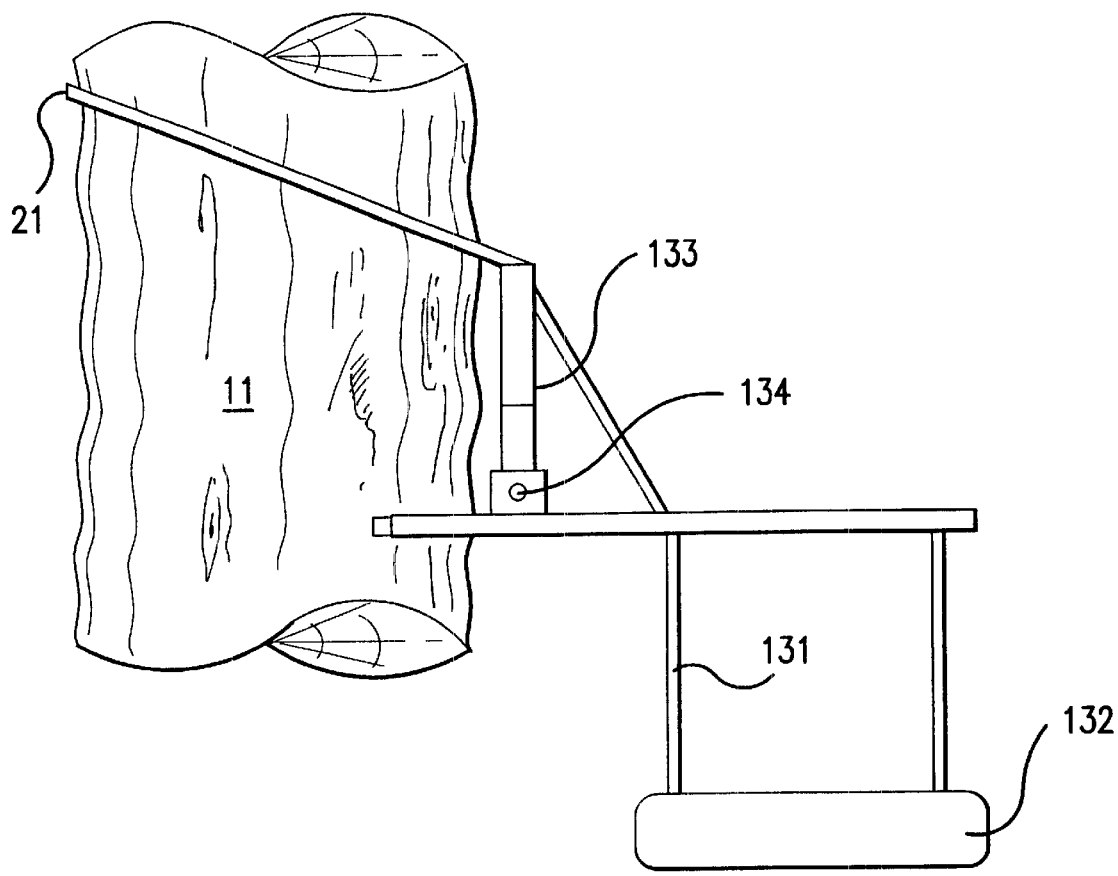
FIG. 15a shows a side elevation of the same embodiment of a single belt design of FIG. 13.
Figure 15B:
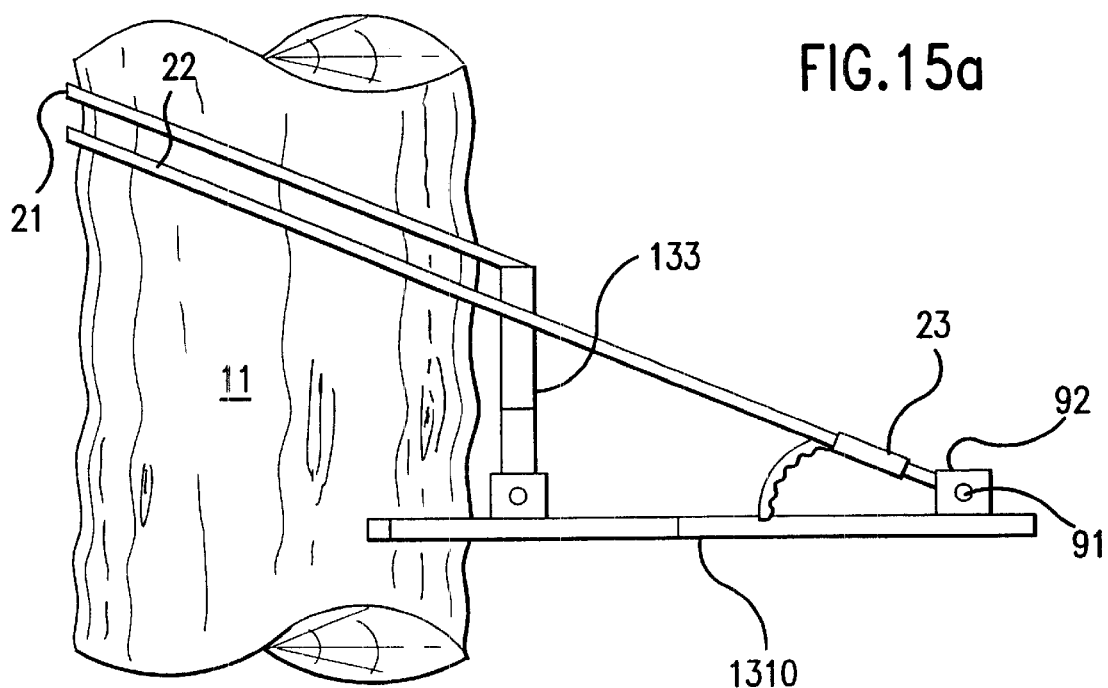
FIG. 15b shows a side elevation of an embodiment for a dual belt design of a main platform have the dual belt design of the hand climber of FIG. 14.
Figure 16:
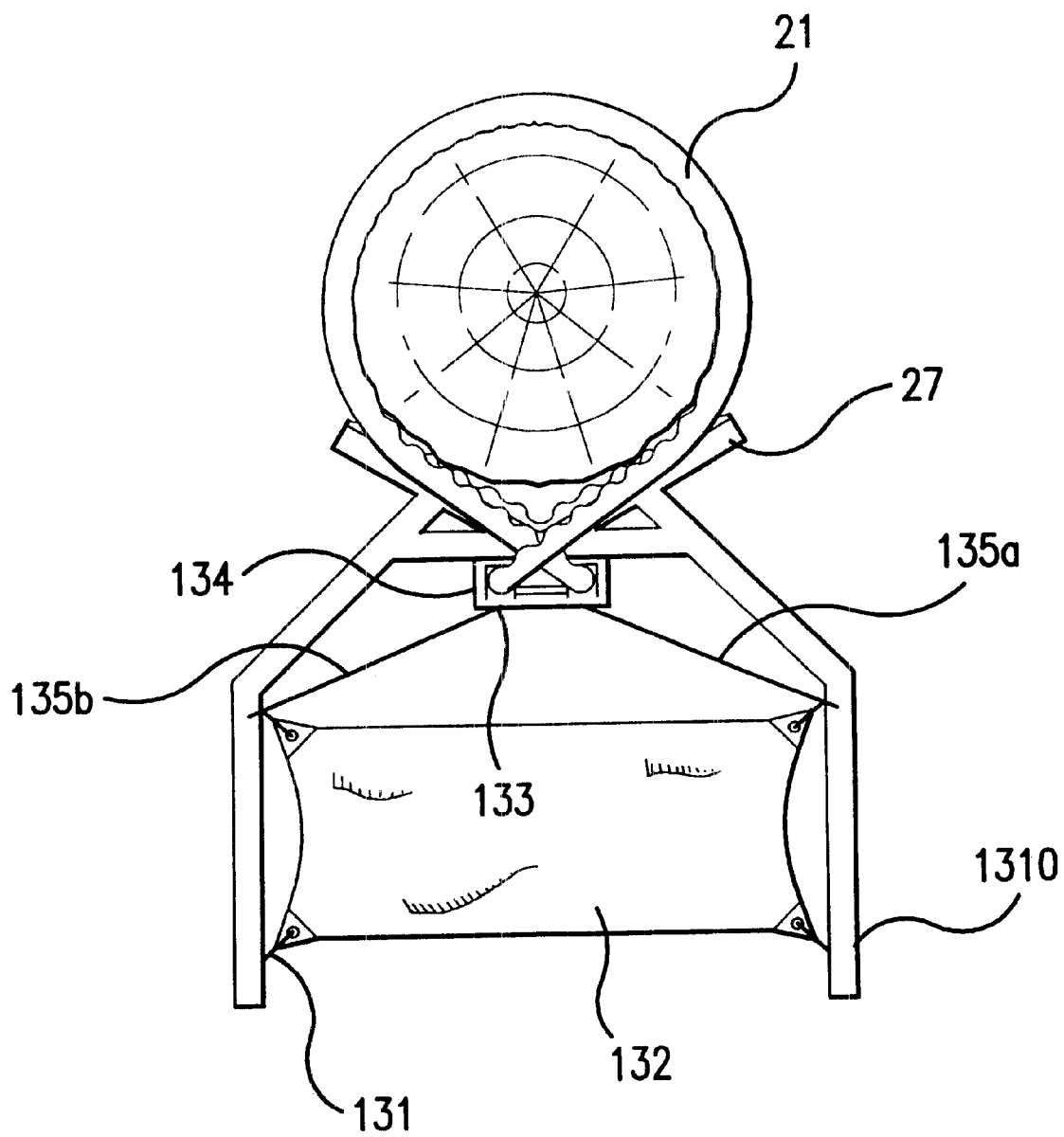
FIG. 16 shows a top plan view of same embodiment shown in FIG. 13 attached to a tree.

FIG. 15a shows the side view of a single belt design climber similar to the double belt design climber of FIG. 14. The single belt climber has center angle arms 133, a pivot point 134 and a seat 132 connected to the climber by connections 131. FIG. 15b shows a double belt design tree stand (without seat) similar to the configuration of the climber shown in FIG. 14. Belt 21 is attached to center angle arm 133 and belt 22 is attached to platform 1310 by locking device 23 having a loop and lock design (91 and 92) as shown in FIG. 9 or 10.

FIG. 3 shows another embodiment of the stand of the invention having a platform 210 which is attached to a tree 11 by belts 21 and 22. This embodiment also shows the belt guide 26 and which may pivot at point 26a. The stand in FIG. 3 also shows a locking device 23 allowing adjustment to belts 21 and 22.

Figure 20:
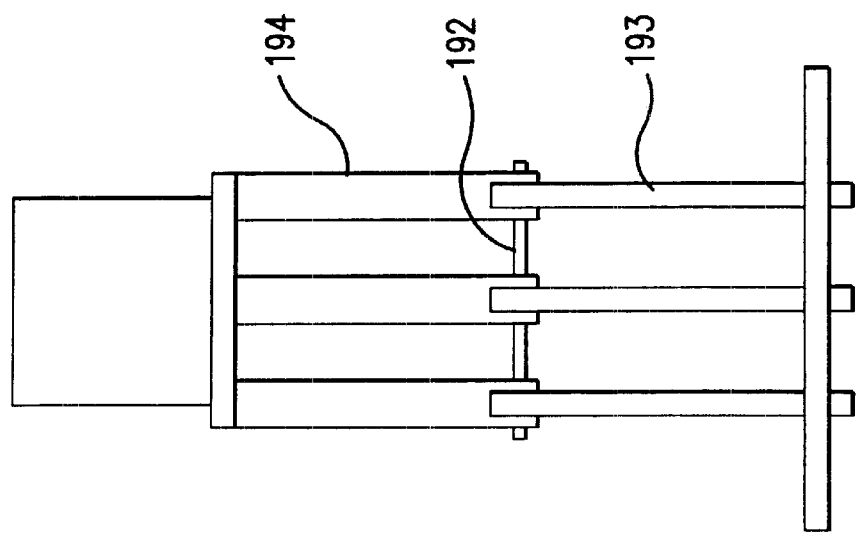
FIG. 20 shows a front view elevation of the same design as in FIG. 19.
Figure 19:
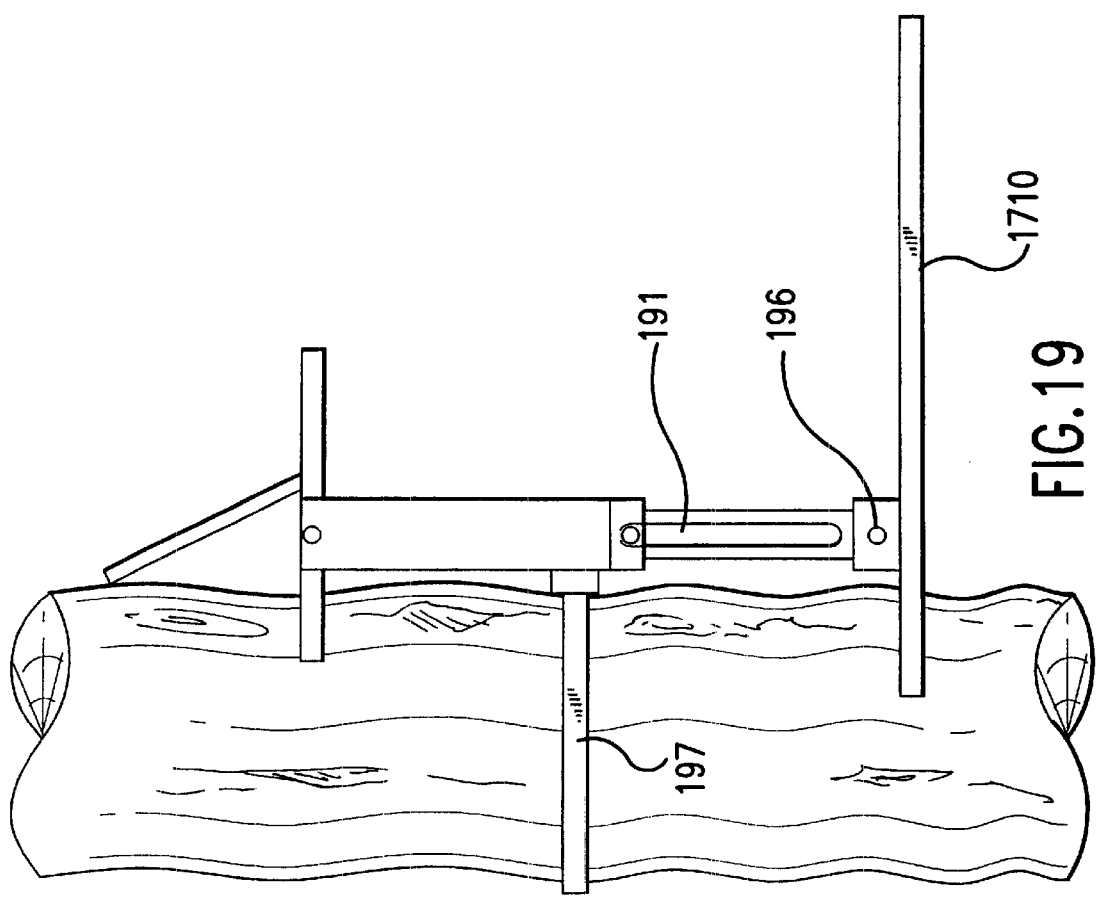
FIG. 19 shows a side view elevation of the stand and climber combination in FIG. 17 with climber section extended.

FIGS. 17, 19 and 20 show the features of a climber and stand in combination. The device in FIG. 17 shows a main platform 1710 having a dual system locking device with handles 181 and a climber with lateral supports 173 (which may serve as a seat) and a seat back 172. The lateral supports 173 also comprise a dual system locking device. The climber and stand platform are connected by adjustable sliding supports 193 and 194 which may pivot at rod 192 and point 196 (see FIGS. 19 and 20). The climber and stand combination may also comprise an additional connecting support 171. In operation, the climber and stand operate together as one unit. An optional safety lockdown belt 197 may also be provided.

Figure 23:
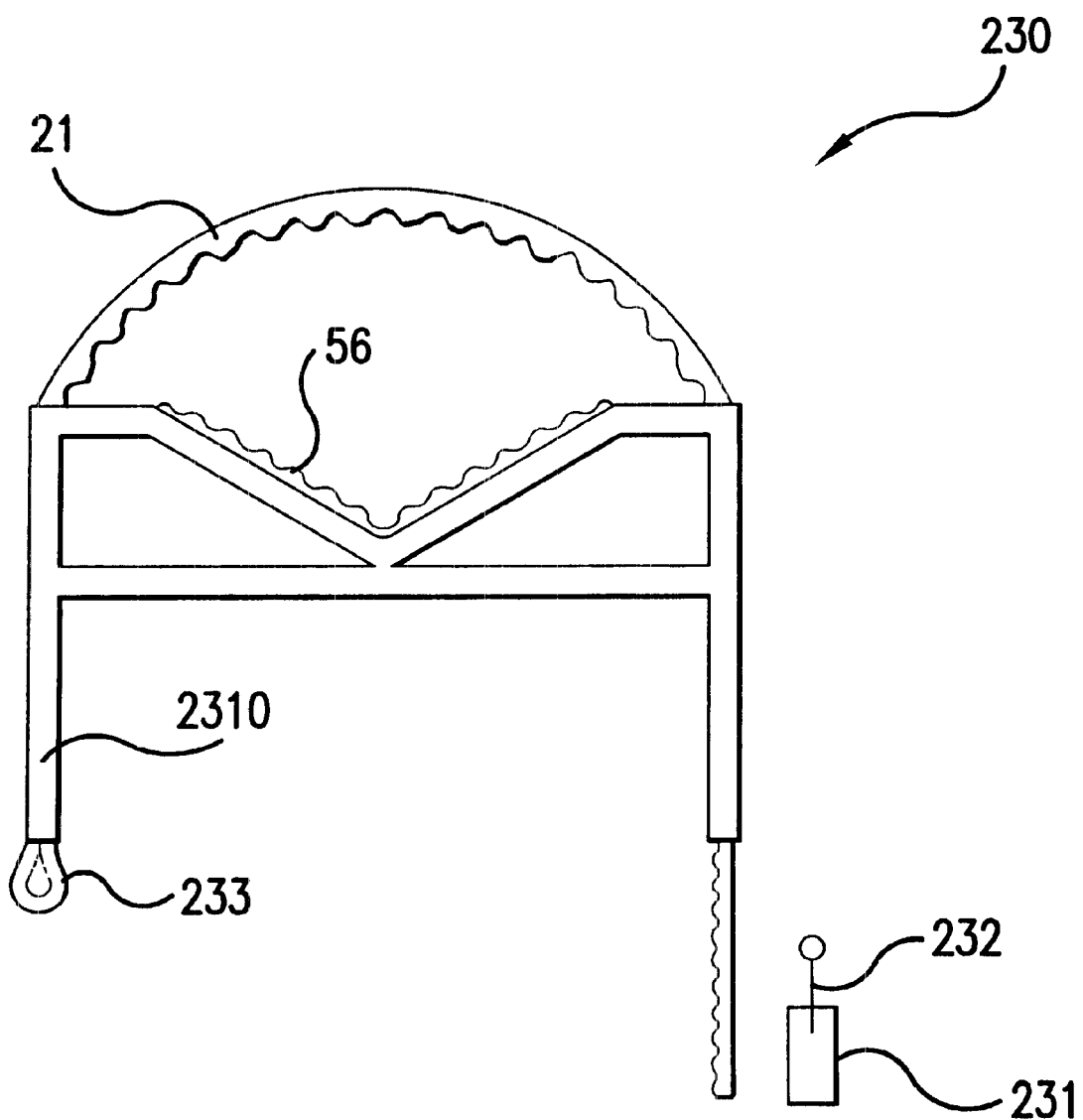
FIG. 23 shows a topside drawing of a hand climber design which uses the belt loop as a stop point.
Figure 23A:
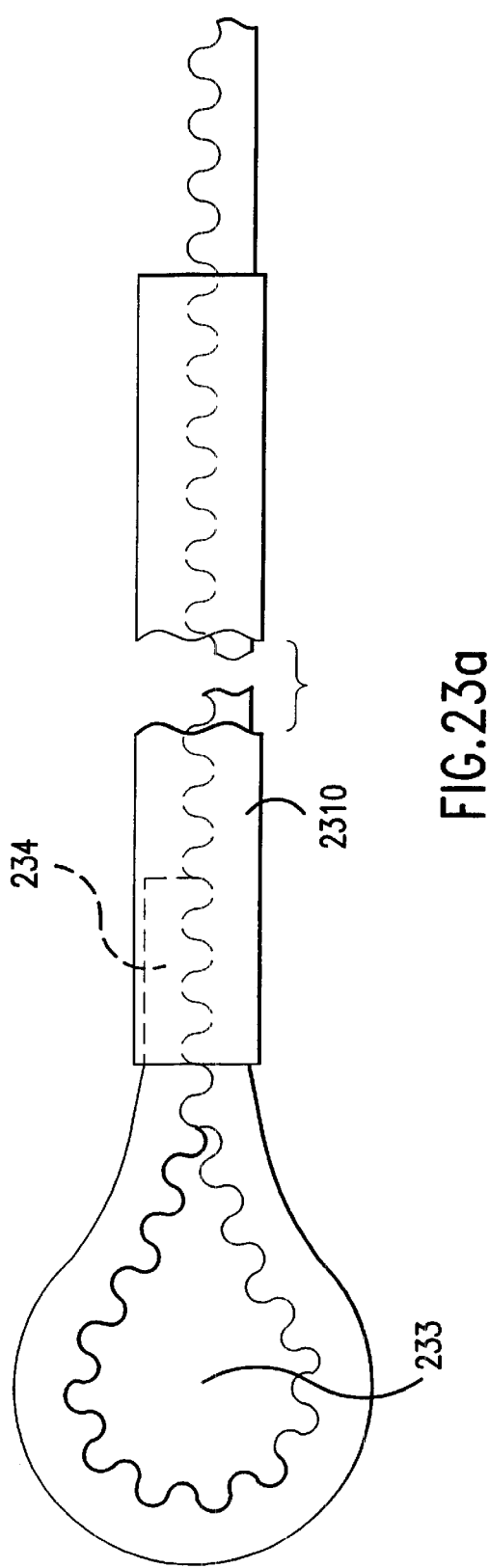
FIG. 23a shows a detail of the left side of FIG. 23.
Figure 23B:
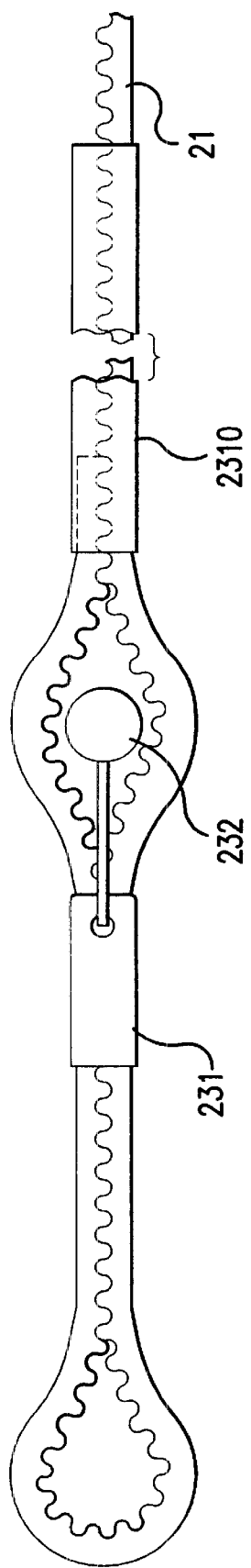
FIG. 23b shows a detail of the right side of FIG. 23.

FIG. 23 shows a simple style hand climber 230 in which the belt material is threaded through a square channel of one inch or equivalent aluminum. The locking means are shown in detail in FIG. 23a and FIG. 23b. The belt 21 is bent 233, meshed together 234 with its uniform teeth and then reinserted into the channel of aluminum 2310. The radius or bend 233 is larger and will not pass through the channel. This allows a safe method of securing the belt. FIG. 23b demonstrates how a pin or other objects 232 and an additional channel 231 can be inserted between the two belts. This forms an increased bulge area of the belts and thus allows the individual to adjust belt length easily and safely. A small channel of square aluminum can be used to slide up behind the object thus securing it in place. Adjusting the belt length is then done by removing the pin, adjusting the belt either forward or backward and then reinserting the pin or object between the belts. This, in turn, creates a larger area that is unable to pass through the square aluminum channel 2310. A tree stand main platform could also be designed using this belt-locking concept.

Figure 24:
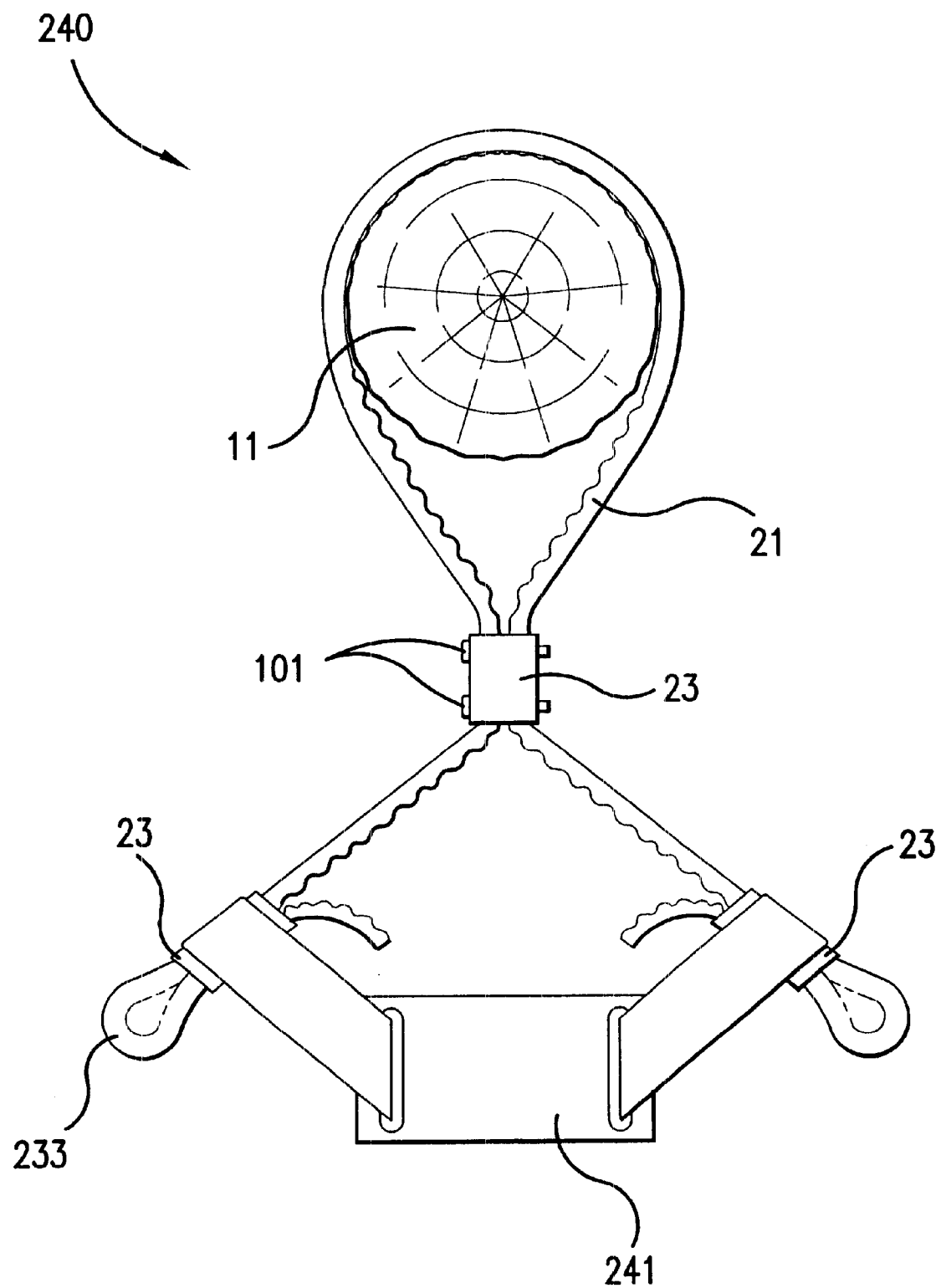
FIG. 24 shows a top plan view of a simple climbing device which comprises a belt attached to a tree with seating arrangement attached.

FIG. 24 refers to a simple climbing device concept 240. This climber may be used in combination along with a main climbing stand; an example of a main climbing stand of such nature can be seen in FIG. 2. The climbing device 240 consists of a single belt 21, one open channel locking device 23 with locking pins 101 positioned such that the belt may be adjusted and locked into position around the tree 11. Two optional locking devices 23 located at or near the ends of the belt 21 allow adjustment of the length of the belt 21 to adjust the position of the seat 241 which is attached to the belt 21. In another aspect, the seat 241 may be removed from the climbing device 240 such that the climbing device 240 comprises at least one belt 21 and at least one locking device 23. In the use of the climbing device 240 an individual would first place the belt 21 around the tree 11. Secondly, the locking device 23 would be placed and secured with pins 101. The placement of the locking device 23 would allow the individual to adjust forward or backward to provide a secure hold around the tree 11. Next the two locking devices 23 that are connected to the seating arrangement 241 are connected to belt 21. Each end of the belt 21 is secured to locking devices 23 by the belt loops 233. The belt loops 233 that are formed, are larger than channels of the locking devices 23 thus providing a secure hold when weight is applied downward from the individual. This loop locking design concept is explained in detail in reference back to FIG. 23. The seat 241 and/or the ends of the belt support the weight of the individual while climbing.

Figure 25A:
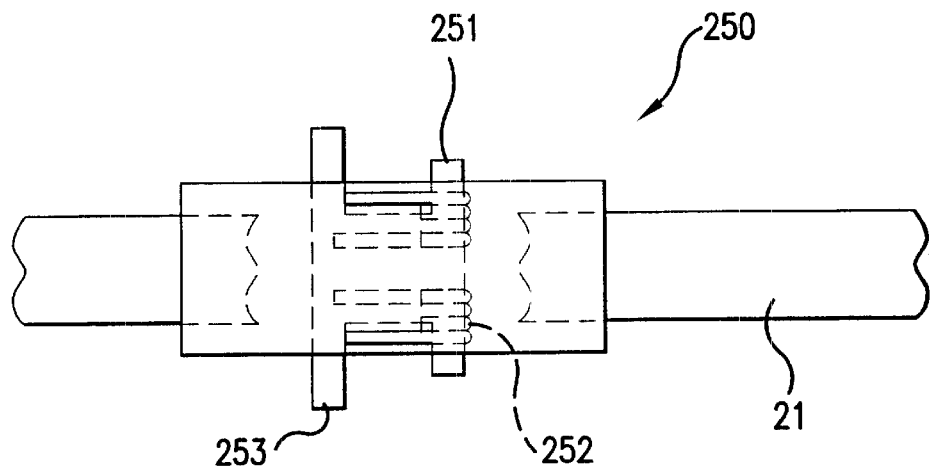
FIG. 25a shows a top view plan of another belt locking and adjustment feature, which may be designed a slip and lock design or slip-lock device.
Figure 25B:
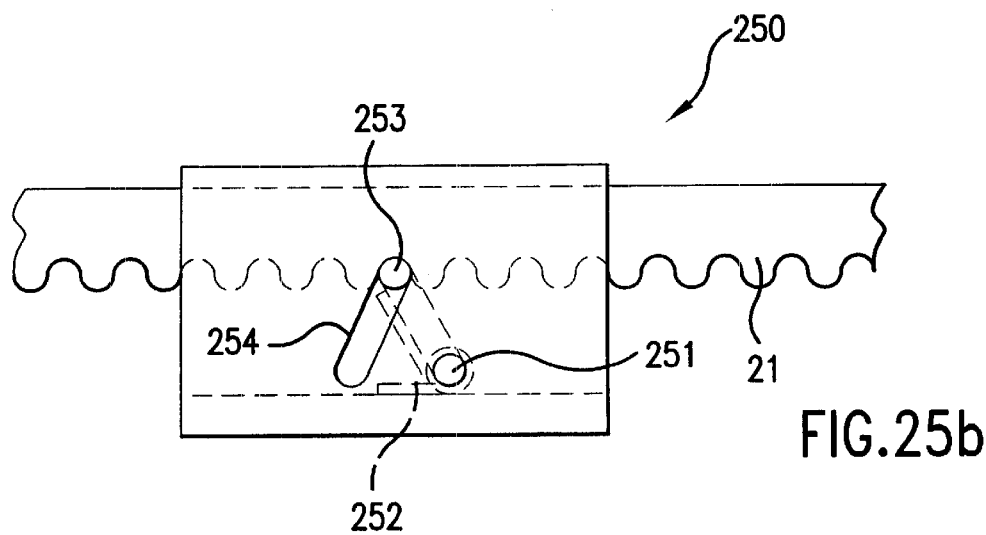
Figure 25C:
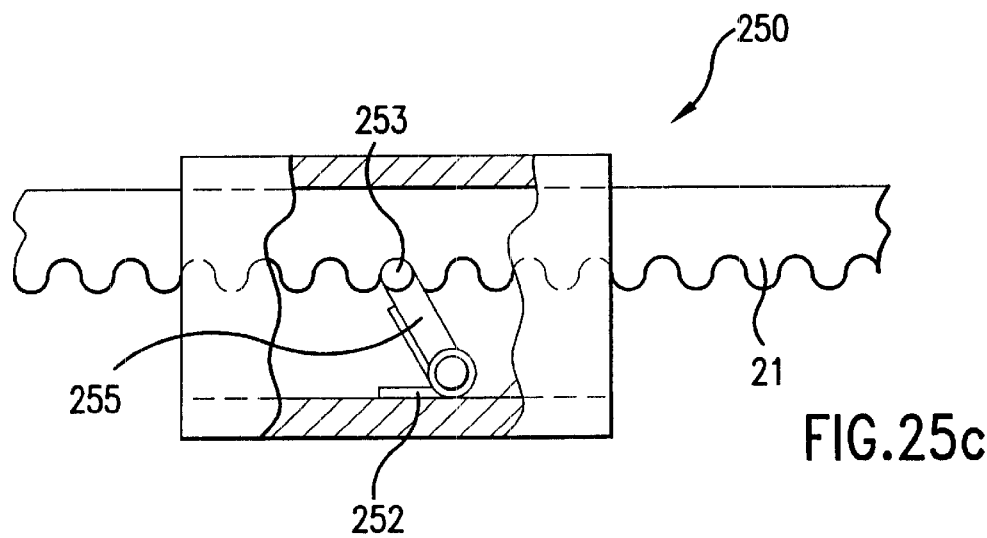
FIG. 25c shows a fragmentary side view of the slip and lock device in the locked position.

FIG. 25 shows an additional locking device called the slip-lock device 250. The slip-lock design allows free movement of the belt 21 in one direction (the slip direction) while preventing movement of the belt in the opposite direction through the device (the lock direction). The slip-lock device 250 features a lever pivot point 251, a lever 255, and a spring arrangement 252 which maintains the one or move lever contact points 253 at a position such that the contact points engages the belt and preferably engages one or more of the notches, grooves, teeth, ribs, etc. of the belt 21. Thus, the lever may have a single or multiple contact points to engage the belt. An extension of the lever contact point 253 may also serve as a button or pressure point to disengage the contact points from the belt by depressing or putting pressure on the extension. An extension on the lever 255 may also serve the same purpose. A grove or slot 254 in the slip-lock device 250 provides a track for the lever extension to follow when depressed. The contact points may comprise two or more teeth, grooves, etc. corresponding to the teeth, grooves, etc. of the belt 21. Such teeth, grooves, etc. forming the contact points may be made from any material or may be constructed from a portion of a belt having teeth, grooves, etc. The spring arrangement 252 maintains pressure on the lever 255 so that the contact point(s) 253 lock into the belt's teeth, grooves, notches, etc. This arrangement allows the belt 21 to be inserted and move freely in a first direction in or through the device 250. Movement in the opposite (or second) direction in or through the device 250 is prevented because the lever 251 and contact point(s) 253 clamp or wedge the belt 21 against the inside wall of the device 250 opposite the contact point(s) 253. The slip-lock device 250 can easily be disengaged to allow free movement of the belt in both the first and second directions by applying pressure on the extended lever or extended contact point(s). The groove or slot 254 allows the extension to be moved in a downward position, thus disengaging the contact points from the belt. This locking concept can in accordance with the invention be used with other fastening devices such as chains, cables, bands, straps, ropes, rods, bars, blades, etc., although the use of fastening devices having teeth, notches, grooves, etc. for engaging the contact point(s) are preferred. Other locking concepts having a slip-lock function for use with the invention will be readily apparent to one skilled in the art.

Figure 26A:
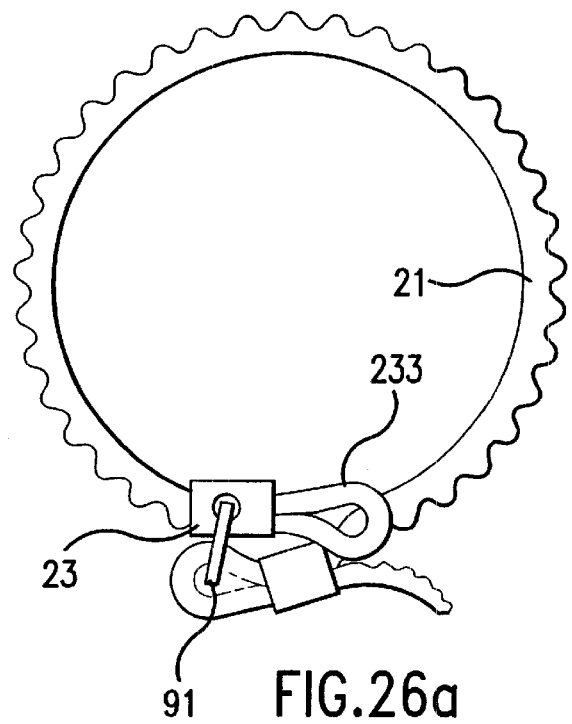
FIG. 26a shows a top view of a belt arrangement that demonstrates two loop and lock design features, along with a reversal of belt design to enable a tight hold.
Figure 26B:
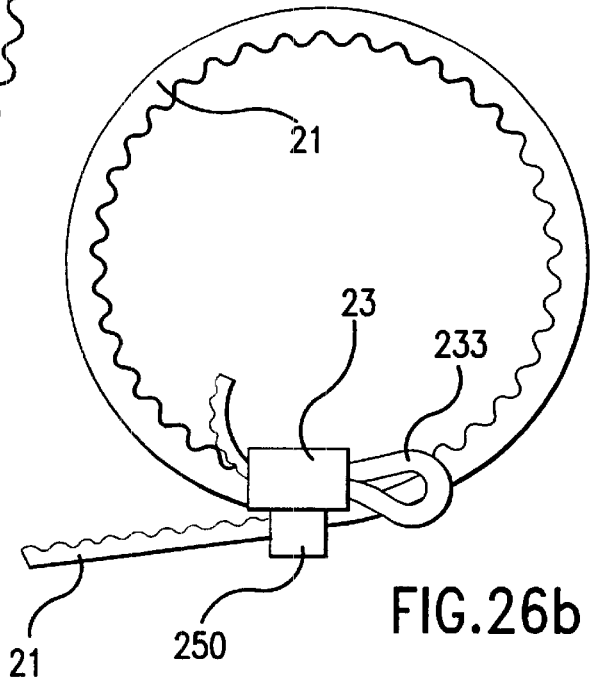
FIG. 26b features another top view of a belt arrangement, which demonstrates a locking concept utilizing a loop and lock and a slip and lock design.
Figure 26C:
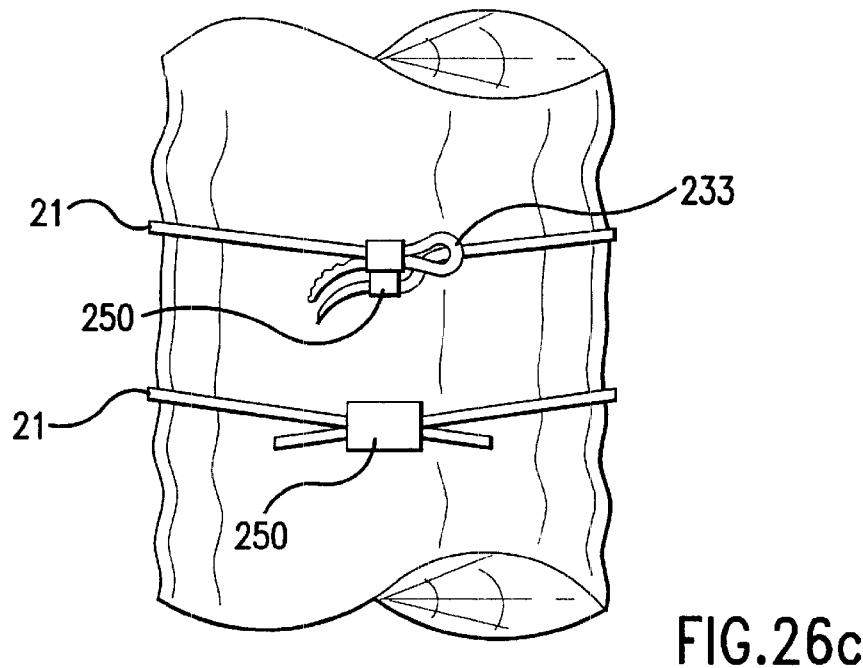
FIG. 26c shows two belt configurations attached to a tree or pole. The upper belt configuration depicts a combination of a loop and lock design and slip and lock design (FIG. 26b). The lower configuration may comprise a single slip-lock device or two slip-lock devices.

FIG. 26 shows various methods for attaching a belt to a tree or pole type structure using combinations of locking devices with different belt positioning. In one aspect, the flat portion of the belt is positioned to contact the tree or pole like structure while in another aspect, the teeth, notches, etc. of the belt are positioned to contact the tree or pole structure. FIG. 26a utilizes two loop and lock locking devices 23 with cylindrical rod 91 and loop 133. In this embodiment, the cylindrical rod 91 of one locking device is fastened to the other locking device. The belt 21 encircles a tree or pole with the teeth, notches or grooves of the belt facing outward or away from the tree or pole. This belt position allows the belt 21 to be easily threaded around the cylindrical rod 91, thus providing a means to tighten and secure the belt to a tree or pole like structure. FIG. 26b depicts the use of two locking devices, a loop and lock device 23 and a slip-lock device 250. The belt 21 is positioned so that the teeth, grooves, etc. face or contact the tree or pole structure. The belt 21 is attached by encircling the tree or pole and inserting the belt 21 into the slip-lock device 250. The length of the belt 21 may then be adjusted by pulling the belt 21 through the slip-lock device 250 in the "slip" direction. This allows the belt 21 to be pulled and locked tight around the tree or pole like structure. FIG. 26c shows the belt locking concept of FIG. 26b attached to a tree or pole like structure (top) and another locking concept (bottom) which uses at least one slip-lock device 250. When using a single slip-lock device, one end of the belt can be fastened to a portion of the slip-lock device 250 while the other end of the belt is inserted through the device in the "slip" direction to allow adjustment of the belt length. If two slip-lock devices are used, one end of the belt is inserted through the first slip-lock device and the second end of the belt is inserted through the second slip-lock device. In this aspect, belt adjustment may be accomplished by pulling either or both ends of the belt in the "slip" direction.

Figure 27A:
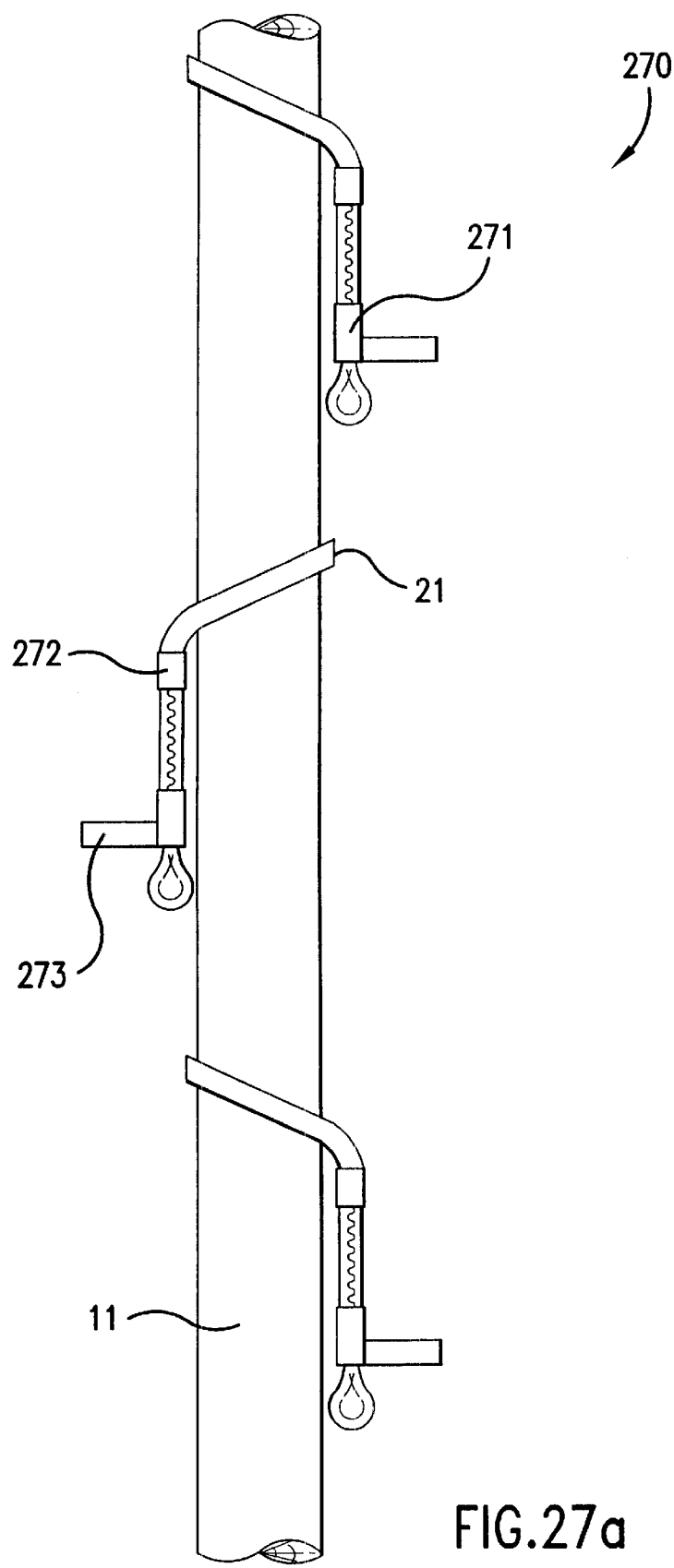
FIG. 27a shows a tree or pole with climbing steps comprising at least one belt and at least one locking device. The steps are shown in a ladder configuration which provides a means to climb a pole or tree.
Figures 1, 27B:
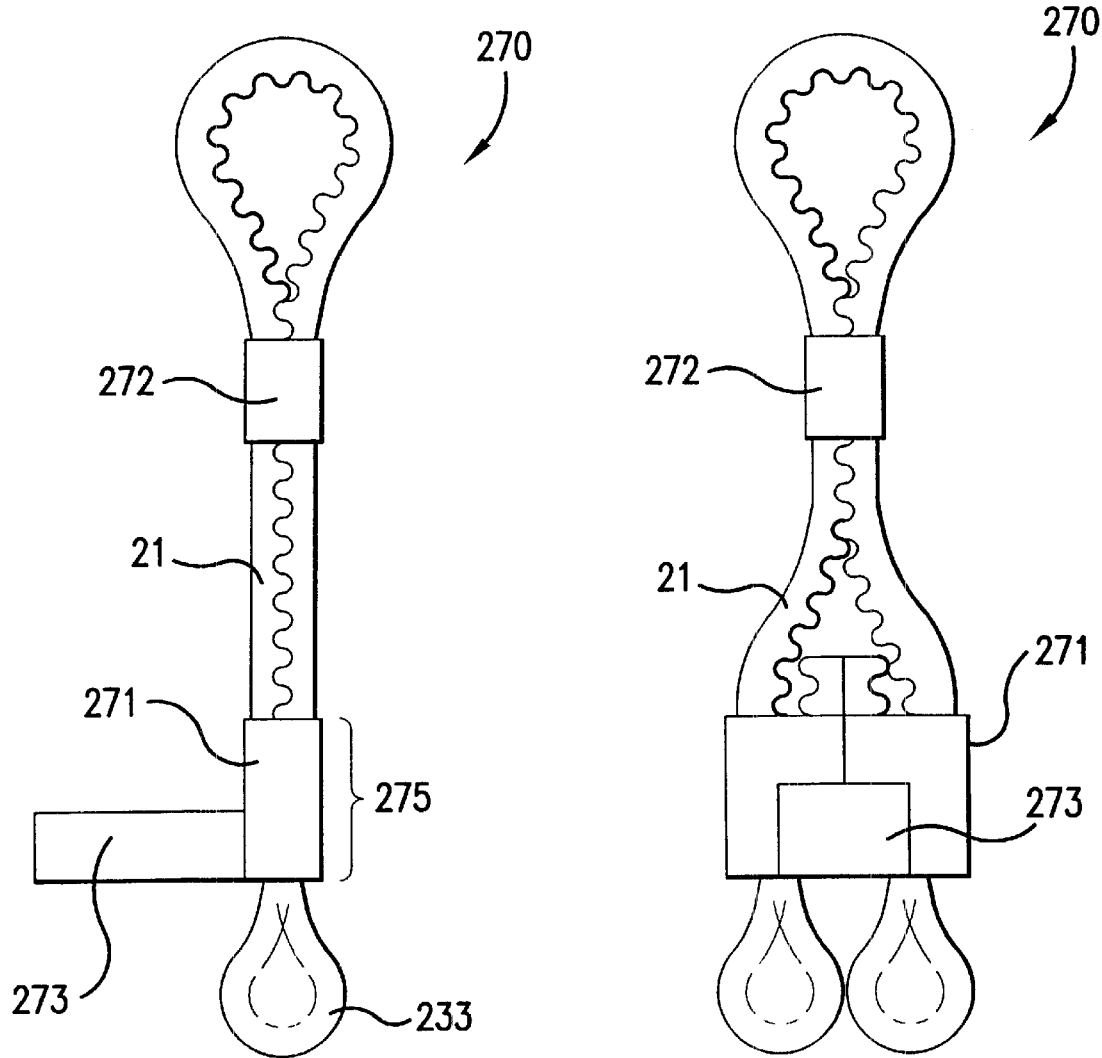

FIG. 27 shows portable steps 270, attached to a tree or pole like structure 11. The step(s) comprise at least one fastening device (such as cables, belts, chains, ropes, straps, bands, etc.) and at least one locking device for fastening, fixing or engaging the fastening device to the tree or pole structure. The step 270 preferably uses a least one belt 21 (which preferably has teeth, notches, grooves, etc.). The step preferably comprises a structure which may be used as a foot rest and/or hand grip for climbing. Such structure may be made from the belt or fastening device (for example by making a loop in the belt) or may be attached to the belt or the locking device. FIG. 27a shows the steps at different elevations on opposite sides of the tree or pole to form a ladder for climbing. FIG. 27b shows a locking device 272 (similar to the open channel locking device in FIGS. 11, 23 and 24), a hand grip/foot rest structure 275 having a foot rest and/or hand grip 273 and a locking device 271 (similar to the channel locking device) for locking or attaching the foot rest/hand grip structure 275 to the belt 21. Loop 233 of the channel lock design holds the foot rest/hand grip structure 275 in place. In accordance with the invention, any locking device may be used to facilitate attachment of the fastening device of the step (e.g., the belt of the step) to the tree or pole structure. For example, the slide and lock design (FIG. 8), the channel lock design (FIGS. 11 and 23) and the slip-lock design (FIG. 25) allows attachment of the belt to the tree without the need to disengage the hand grip/foot rest structure 275. Thus, the step of the invention may comprise a belt or other fastening structure and at least one hand grip/foot rest structure preferably fastened at or near at least one end of the belt or fastening device. The other end of the belt or fastening structure may then be used to encircle the tree or pole structure and the locking device can then be used to lock the belt or fastening device around the tree. If a slip-lock device is used, the belt or fastening device may be placed around the tree and the end may be pulled through the slip-lock device in the "slip" direction to tighten the belt or fastening device around the tree or pole. This allows quick and easy placement of the steps of the invention. Thus the steps of the invention can be placed on the tree or pole structure at various positions and elevations while climbing, using the previously placed steps to support the individual while additional steps are added.

Although the present invention and various designs stated of such said invention have been described with reference to the preferred embodiments; modifications or variations using any of the design concepts of the preferred embodiments will still enable the results to fall within the scope of the invention. No limitation with respect to the specific embodiments disclosed herein is intended or should be inferred.

All publications, patents and patent applications mentioned in this specification are indicative of the level of skill of those skilled in the art to which this invention pertains, and are herein incorporated by reference to the same extent as if each individual publication, patent or patent application was specifically and individually indicated to be incorporated by reference.

I claim:

1. A device which comprises a platform, having at least one locking device and at least one belt for attaching said device to a desired structure, said at least one locking device capable of engaging said at least one belt in a fixed position, wherein said belt comprises a plurality of teeth spaced along the length of said at least one belt, and wherein said locking device comprises a plurality of teeth.

2. The device of claim 1, wherein when said locking device is in an unlocked position, said locking device allows movement of said at least one belt relative to said locking device.

3. The device of claim 1, wherein when said locking device is in a locked position, said locking device prevents movement of said at least one belt relative to said locking device.

4. The device of claim 1, wherein when said locking device is in a locked position, the plurality of teeth of said at least one belt and the plurality of teeth of said locking device mesh.

5. The device of claim 1, wherein when said locking device is in a locked position, the plurality of teeth of said at least one belt and the plurality of teeth of said locking device do not mesh.

6. The device of claim 1, wherein the plurality of said teeth of said at least one belt are positioned perpendicular to the length of said at least one belt.

7. The device of claim 1, wherein the plurality of said teeth of said at least one belt have the same height and width.

8. The device of claim 1, wherein the plurality of said teeth of said at least one belt are uniformly spaced along the length of said at least one belt.

9. The device of claim 1 wherein said platform and said at least one belt for attaching said tree stand to a desired structure comprises a tree stand, wherein said at least one belt is a rubber belt, a plastic belt or a polymer belt.

10. The device of claim 9, wherein said platform comprises at least two belts, wherein at least one of said belts is a rubber belt, and plastic belt or a polymer belt.

11. The device of claim 9, wherein said platform comprises at least a first locking device which is capable of engaging said at least one belt in a fixed position.

12. The device of claim 11, wherein when said locking device is in an unlocked position, said locking device allows movement of at least one belt relative to said locking device.

13. The device of claim 11, wherein when said locking device is in a locked position, said locking device prevents movement of said at least one belt relative to said locking device.

14. The device of claim 11, wherein said locking device allows movement of said at least one belt in a first direction and prevents movement of said at least one belt in a second direction.

15. The device of claim 9, wherein said at least one belt is a rubber belt.

16. The device of claim 15, wherein said at least one belt further comprises threads, fibers, or metal wires.

17. The device of claim 9, wherein said at least one belt further comprises threads, fibers or metal wires.

18. The device of claim 9, wherein the plurality of teeth of said at least one belt are positioned perpendicular to the length of said at least one belt.

19. The device of claim 18, wherein said at least one belt further comprises threads, fibers or metal wires.

20. The device of claim 18, wherein the plurality of said teeth of said at least one belt are uniformly spaced along said at least one belt.

21. The device of claim 18, wherein the plurality of said teeth of said at least one belt have the same height and width.

* * * * *